(12) United States Patent
Zhang et al.

(10) Patent No.: US 9,589,735 B2
(45) Date of Patent: Mar. 7, 2017

(54) MATERIALS THAT INCLUDE CONCH SHELL STRUCTURES, METHODS OF MAKING CONCH SHELL STRUCTURES, AND DEVICES FOR STORING ENERGY

(71) Applicant: King Abdullah University of Science and Technology, Thuwal (SA)

(72) Inventors: Xixiang Zhang, Thuwal (SA); Yingbang Yao, Thuwal (SA); Zhihong Wang, Thuwal (SA)

(73) Assignee: KING ABDULLAH UNIVERSITY OF SCIENCE, Thuwal (SA)

(*) Notice: Subject to any disclaimer, the term of this patent is extended or adjusted under 35 U.S.C. 154(b) by 250 days.

(21) Appl. No.: 14/203,739

(22) Filed: Mar. 11, 2014

(65) Prior Publication Data

US 2014/0255784 A1  Sep. 11, 2014

Related U.S. Application Data

(60) Provisional application No. 61/775,779, filed on Mar. 11, 2013.

(51) Int. Cl.
*H01G 9/07* (2006.01)
*H01M 4/04* (2006.01)
*H01M 4/36* (2006.01)
*H01M 4/58* (2010.01)
*H01G 4/06* (2006.01)

(52) U.S. Cl.
CPC ............... *H01G 9/07* (2013.01); *H01G 4/06* (2013.01); *H01M 4/043* (2013.01); *H01M 4/366* (2013.01); *H01M 4/5825* (2013.01); *Y10S 977/948* (2013.01); *Y10T 29/49115* (2015.01); *Y10T 83/04* (2015.04)

(58) Field of Classification Search
CPC ....... Y10S 977/948; B82Y 30/00; H01G 9/07; H01M 4/366; H01M 4/043
See application file for complete search history.

(56) References Cited

U.S. PATENT DOCUMENTS

| | | | | |
|---|---|---|---|---|
| 2010/0176337 | A1* | 7/2010 | Zhamu | H01M 4/1391 252/182.1 |
| 2011/0033746 | A1* | 2/2011 | Liu | H01M 4/366 429/209 |
| 2013/0065026 | A1* | 3/2013 | Walther | D21H 27/32 428/195.1 |
| 2014/0158020 | A1* | 6/2014 | Wegst | C08K 3/08 106/135.1 |

FOREIGN PATENT DOCUMENTS

WO    WO 2011107662 A1 *  9/2011  ............. D21H 27/32

OTHER PUBLICATIONS

"Lambdoidal Layup of Aragonite Sheets in Conch Shell", Bin Chen, Xianghe Peng and Xinyan Wu, Department of Engineering Mechanics, Chongqing University, Published Online Apr. 15, 2007.*

* cited by examiner

*Primary Examiner* — Stewart Fraser
(74) *Attorney, Agent, or Firm* — Thomas|Horstemeyer, LLP

(57) ABSTRACT

Embodiments of the present disclosure provide for materials that include conch shell structures, methods of making conch shell slices, devices for storing energy, and the like.

5 Claims, 14 Drawing Sheets

MATERIALS THAT INCLUDE CONCH SHELL STRUCTURES, METHODS OF MAKING CONCH SHELL STRUCTURES, AND DEVICES FOR STORING ENERGY

CLAIM OF PRIORITY TO RELATED APPLICATION

This application claims priority to U.S. provisional application entitled "MATERIALS THAT INCLUDE CONCH SHELL STRUCTURES, METHODS OF MAKING CONCH SHELL STRUCTURES, AND DEVICES FOR STORING ENERGY" having Ser. No. 61/775,779, filed on Mar. 11, 2013, which is entirely incorporated herein by reference.

BACKGROUND

Novel physics and properties have been discovered in different assembled nanomaterials synthesized by the bottom-up technique, which enables us to make and build new electronic, photonic, and magnetic devices based on those properties. Nature has long used bottom-up synthesis to fabricate nano-materials that exhibit much better physical properties than their man-made counterparts. For example, superior optical properties are observed in the nanometer-scale architectures of Brittlestars, butterflies, and many insects; super-hydrophobic effects are evident in lotus plants and water bugs.

SUMMARY

Embodiments of the present disclosure provide for materials that include conch shell structures, methods of making conch shell slices, devices for storing energy, and the like.

An embodiment of the present disclosure provides for a structure, among others, that includes: a nanocomposite structure including nano-$CaCO_3$ lamina dispersed in a biopolymer matrix, where the nanocomposite structure is obtained from a conch shell having predetermined dimensions. In an embodiment, the structure has a thickness of about 0.4 to 0.6 mm.

An embodiment of the present disclosure provides for a structure, among others, that includes: a conch shell slice having predetermined dimensions and the conch shell slice has one or more characteristics selected from the following: a remanent electrical polarization of about 2 to 4 k$\mu$Ccm$^{-2}$, a relative dielectric constant of about 80 to 300 at a frequency of about 100 Hz and a relative dielectric constant of about 13 to 19 at about 1 MHz; and a remanent polarization of about 3000 to 3200 $\mu$Ccm$^{-2}$ at 3.1 mHz and a remanent polarization of about 2050 to 2250 $\mu$Ccm$^{-2}$ at 0.01 Hz. In an embodiment, the conch shell slice has a thickness of about 0.4 to 0.6 mm.

An embodiment of the present disclosure provides for an energy storage structure, among others, that includes: a structure selected from: a) a nanocomposite structure including nano-$CaCO_3$ lamina dispersed in a biopolymer matrix, where the nanocomposite structure is obtained from a conch shell having predetermined dimensions; or b) a conch shell slice having predetermined dimensions and conch shell slice has one or more characteristics selected from the following: a remanent electrical polarization of about 2 to 4 k$\mu$Ccm$^{-2}$, a relative dielectric constant of about 80 to 300 at a frequency of about 100 Hz and a relative dielectric constant of about 13 to 19 at about 1 MHz; and a remanent polarization of about 3000 to 3200 $\mu$Ccm$^{-2}$ at 3.1 mHz and a remanent polarization of about 2050 to 2250 $\mu$Ccm$^{-2}$ at 0.01 Hz.

An embodiment of the present disclosure provides for a method of obtaining a structure, among others, that includes: slicing a conch shell to have predetermined dimensions to form a conch shell slice, where the conch shell slice has one or more characteristics selected from the following: a remanent electrical polarization of about 2 to 4 k$\mu$Ccm$^{-2}$, a relative dielectric constant of about 80 to 300 at a frequency of about 100 Hz and a relative dielectric constant of about 13 to 19 at about 1 MHz; a remanent polarization of about 3000 to 3200 $\mu$Ccm$^{-2}$ at 3.1 mHz and a remanent polarization of about 2050 to 2250 $\mu$Ccm$^{-2}$ at 0.01 Hz.

An embodiment of the present disclosure provides for an energy storage structure, among others, that includes: a nanocomposite including nano-sized particles dispersed in a polymer matrix, wherein the nanocomposite is selected from the group consisting of $CaCO_3$ powders and conch shell particles.

An embodiment of the present disclosure provides for a method of obtaining an energy storage structure, among others, that includes: coating nano-sized particles with a thin layer of polymer to form core-shell particles, wherein the nano-sized particles are selected from the group consisting of $CaCO_3$ powders and conch shell particles; pressing the core-shell particles together to form a sheet of nanocomposite; heating the nanocomposite material; and attaching one or more electrodes to the sheet.

Other compositions, methods, features, and advantages will be, or become, apparent to one with skill in the art upon examination of the following drawings and detailed description. It is intended that all such additional compositions, methods, features, and advantages be included within this description, be within the scope of the present disclosure, and be protected by the accompanying claims.

BRIEF DESCRIPTION OF THE DRAWINGS

Many aspects of this disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3A is a graph that illustrates the first and third J-E loops measured with a field-frequency of 0.0031 Hz, corresponding to a field ramping rate of 500 V/cm per second. FIG. 3B is a graph that illustrates the P-E loops measured after the first and third J-E with a field-frequency of 0.01 Hz. FIG. 3C illustrates a graph of the eighth J-E loop and the corresponding integrated P-E loop with a field-frequency of 0.0031 Hz. FIG. 3D is a graph that illustrates the leakage corrected J-E and P-E loops of FIG. 3C. FIG. 3E is a graph that illustrates the P-E loop measured with pre-poling protocol at 0.01 Hz, the lowest frequency of the instrument, and the corresponding J-E loop. FIG. 3F is a graph that illustrates the leakage corrected J-E and P-E loops of FIG. 3E.

FIG. 4 also includes: Inset (a), the first J-E loop and the fifth J-E curve measured with a field ramping rate of 500 V/cm per second; Inset b, the leakage corrected P-E curve measured with pre-poling after the fifth I-E curve with a frequency of 0.01 Hz and corresponding J-E loop; and Inset c, decrease of the current density at maximum field with the circling the field.

DETAILED DESCRIPTION

Figure 1:
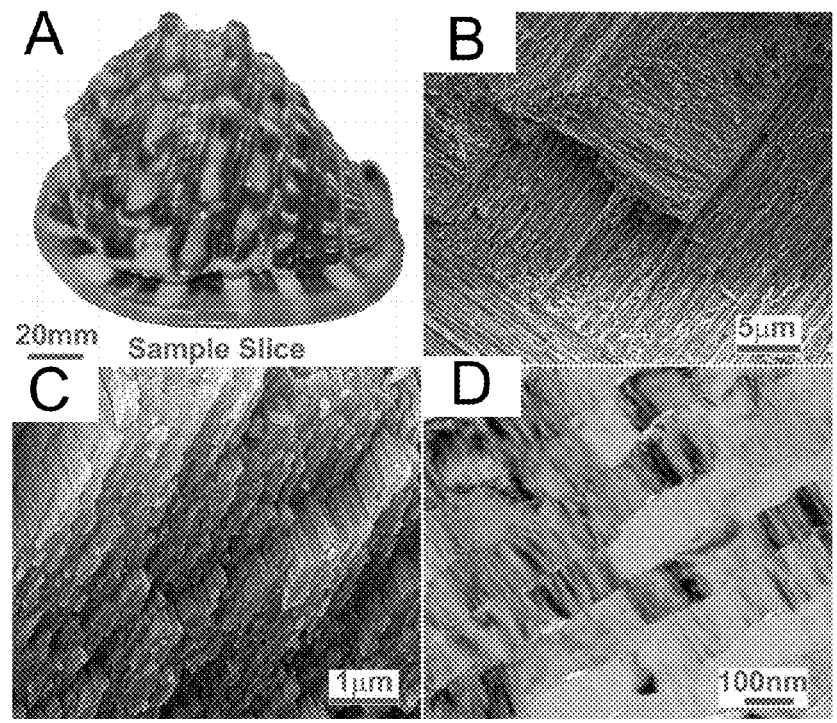
FIG. 1A illustrates a photo of the conch shell used in this study and how the samples were cut.
FIG. 1B is a SEM image showing the micro-architecture of the conch shell.
FIG. 1C is a SEM image showing how the nano-aragonite laminas are assembled.
FIG. 1D is a TEM image of a cross-section of the nano-laminas and the bio-organic matrix between the nano-laminas.

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Embodiments of the present disclosure will employ, unless otherwise indicated, techniques of material science, chemistry, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, dimensions, frequency ranges, applications, or the like, as such can vary. It is also to be understood that the terminology used herein is for purposes of describing particular embodiments only, and is not intended to be limiting. It is also possible in the present disclosure that steps can be executed in different sequence, where this is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Each of the applications and patents cited in this text, as well as each document or reference cited in each of the applications and patents (including during the prosecution of each issued patent; "application cited documents"), and each of the PCT and foreign applications or patents corresponding to and/or claiming priority from any of these applications and patents, and each of the documents cited or referenced in each of the application cited documents, are hereby expressly incorporated herein by reference. Further, documents or references cited in this text, in a Reference List before the claims, or in the text itself; and each of these documents or references ("herein cited references"), as well as each document or reference cited in each of the herein-cited references (including any manufacturer's specifications, instructions, etc.) are hereby expressly incorporated herein by reference.

Prior to describing the various embodiments, the following definitions are provided and should be used unless otherwise indicated.

Discussion

Embodiments of the present disclosure provide for materials that include conch shell structures, methods of making conch shell slices, devices for storing energy, and the like. An advantage of an embodiment of the present disclosure is that the structures or devices including the conch shell structure (e.g., conch shell slices or particles) have characteristics or properties (e.g., a large remanent electrical polarization, relative dielectric constant, and the like) that are superior to other man-made structures or devices. In an embodiment, the structure can be a ferroelectret, a ferroelectric, and/or a pyroelectric, material. In an embodiment, the structure can be as energy storage structures for use in batteries, capacitors, and the like.

In an embodiment, a material includes a nano-$CaCO_3$ lamina dispersed between biopolymer (e.g., protein, glycoprotein, chitin, lustrin, or a combination thereof) structures obtained from a conch shell having predetermined dimensions. In an embodiment, the material is derived from a conch shell. In an embodiment, the conch shell can be from *Strombus pugilis*. In an embodiment, the biopolymer can include those proteins, glycoproteins, chitins, lustrins, or a combination of these that are found in the conch shells such as the *Strombus pugilis*.

In an embodiment, the material can be in the form of a slice of conch shell (conch shell slice) or a particle derived from the conch shell. In an embodiment, the material can be formed by cutting (e.g., low-speed diamond saw or the like) the conch shell along the length (or width) of the conch shell to have a particular width (e.g., a predetermined dimension). In an embodiment, the sliced conch shell can be further processed by milling down the sides of the slice of conch shell along the width to obtain a conch shell slice having a specified width. In an embodiment, the slice of conch shell can be cut and/or milled along the length and/or thickness to obtain a conch shell slice of a predetermined dimension. In an embodiment, the conch shell can be cut, crushed, and/or milled to obtain particles having predetermined dimensions.

In an embodiment, a conch shell slice can have a thickness of about 0.1 mm to 1 mm, about 0.4 to 0.6 mm, or about 0.5 mm; a width of about 2 mm to 20 mm, about 3 mm to 15 mm, or about 5 mm to 10 mm; and a length of about 2 mm to 20 mm, about 3 mm to 15 mm, or about 5 mm to 10 mm.

In an embodiment, the conch shell particles can be in the nanometer range to the micrometer range. In particular, the conch shell particles can have a longest dimension (e.g., a diameter on a spherical or semispherical particle) of about 100 nm to 100 μm, about 200 nm to 50 μm, or about 500 nm to 10 μm. In an embodiment, the conch shell particles can be spherical, semispherical particle, or irregularly shaped.

In an embodiment, the conch shell material can have one or more of the following characteristics or properties: a remanent electrical polarization, a dielectric constant, and a dielectric loss (tan δ), which are unlike single crystal $CaCO_3$, and appear to be related to the structure of the material and the dimensions of the material. In an embodiment, the material can have a remanent electrical polarization of about 1 to 10 k$\mu$Ccm$^{-2}$ or about 2 to 4 k$\mu$Ccm$^{-2}$. In an embodiment, the material can have a relative dielectric constant of about 50 to 1200 or about 80 to 300, at a frequency of about 100 Hz, and a relative dielectric constant of about 13 to 60 or about 13 to 19, at about 1 MHz. In an embodiment, the material can have a remanent polarization of about 1,000 to 10,000 $\mu$Ccm$^{-2}$ or about 3000 to 3200 $\mu$Ccm$^{-2}$, at 3.1 mHz and a remanent polarization of about 1,000 to 10,000 or about 2050 to 2250 $\mu$Ccm$^{-2}$, at 0.01 Hz.

In an embodiment, the structure including the conch shell material (e.g., conch shell slice and/or conch shell particles) can be used as an energy storage structure or device in a structure or device such as a battery or capacitor. As mentioned above, the material can have one or more characteristics or properties (e.g., large remanent electrical polarization, relative dielectric constant) that are advantageous for an energy storage structure. In an embodiment, one or more electrodes can be attached to the material. In particular, the material is a conch shell slice and a pair of electrodes are attached to the conch shell slice (e.g., at opposing ends). In another embodiment, dielectric nanoparticles (e.g., $Al_2O_3$, $SiO_2$, $BaTiO_3$, $PbTiO_3$, and $PbZrO_3$), and $CaCO_3$ or conch shell particles, can be dispersed in polymer matrix to form nanocomposite material, which includes one or more electrodes. In particular, $CaCO_3$ particles can be coated with a polymer (e.g., protein, glycoprotein, chitin, lustrin, and parylene, such as those in a conch shell) and then the coated particles are pressed together to form a structure (e.g., sheet of $CaCO_3$/polymer composite), where the structure includes one or more electrodes. In an embodiment, the amount of $CaCO_3$ or conch shell particles can correspond to the amount of energy storage capacity that is desired for the application. Additional details are provided in the Example.

Now have described embodiment of the present disclosure in general, embodiments of the present disclosure are described in greater detail. In an embodiment, a conch shell was cut into slices of less than 1 mm thick along the shell's length and then ground down to about 0.5 mm. In an embodiment, the basic building blocks of the conch shell slice were found to be nano-laminas that have about 50 nm by 200 nm cross-sections and are about 10-20 μm in length. In an embodiment, the nano-laminas have an orderly assembly with preferential crystalline orientations, similar to self-assembled $Fe_3O_4$ nano-particles. In an embodiment, a conch shell slice has a bio-assembled, hierarchical architecture of nano-$CaCO_3$ laminas sandwiched between biopolymers (e.g., protein, glycoprotein, chitin, and lustrin).

In an embodiment, the conch shell slice exhibits ferroelectret behavior: ferroelectric-like hysteresis loops. In an embodiment, the remanent electrical polarization (e.g., about 2-4 k$\mu$Ccm$^{-2}$) is one order of magnitude higher than the largest electrical polarization reported in man-made ferroelectric materials (146 $\mu$Ccm$^{-2}$) and several orders of magnitude higher than that in electrets, as obtained from square polarization-electric-field hysteresis loops. In an embodiment, the relative dielectric constant can be about 80 to 300 at the low frequency end (100 Hz) and about 13-19 at 1 MHz. These properties differ significantly from those of single crystal slices (0.5 mm thick) of $CaCO_3$ for which the dielectric constant is about 9 and independent of the frequency. The unusually large dielectric constant of the shell indicates that the electrical properties of the conch shell slice differ from those of single crystals of $CaCO_3$.

In an embodiment, the conch shell slice is different from standard ferroelectret and ferroelectric materials in regard to remanent polarization (e.g., about 3100 $\mu$Ccm$^{-2}$ at 3.1 mHz and about 2150 $\mu$Ccm$^{-2}$ at 0.01 Hz), which is more than 20 times larger than the largest remanent polarization in existing materials (146 $\mu$Ccm$^{-2}$) and 2-4 orders of magnitude larger than that in the ferroelectret foams and other electrets. The large remanent polarization of the conch shell slice indicates that nonferroelectric particles, such as $CaCO_3$, can exhibit ferroelectric-like behavior and a super large remanent polarization after being combined with biopolymer to form a composite.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

Novel physics and properties have been discovered in different assembled nanomaterials synthesized by the bottom-up technique, which enables us to make and build new electronic, photonic and magnetic devices based on those properties.[1-7] Nature has long used bottom-up synthesis to fabricate nano-materials that exhibit much better physical properties than their man-made counterparts.[8-13] For example, superior optical properties are observed in the nanometer-scale architectures of Brittlestars, butterflies, and many insects;[14] super-hydrophobic effects are evident in lotus plants and water bugs.[15-16] Superior mechanical properties are found in seashells, which are composed of well-aligned and highly packed aragonite nano-laminas glued together by biopolymers.[8-12] Although the strength and toughness of the nano-composites in seashells have been extensively studied,[8-12] their other extraordinary physical properties have not been described.

Here, we show that conch shells, with bio-assembled, hierarchical architectures of nano-$CaCO_3$ laminas sandwiched between biopolymers, exhibit ferroelectret behavior: ferroelectric-like hysteresis loops.[17-20] Their remanent electrical polarization (2-4 k$\mu$Ccm$^{-2}$) is one order of magnitude higher than the largest electrical polarization reported in man-made ferroelectric materials (146 $\mu$Ccm$^{-2}$)[21] and several orders of magnitude higher than that in electrets,[21,22] as obtained from square polarization-electric-field hysteresis loops. This novel property suggests the possibility of developing nanocomposites with high electrical polarization using the bottom-up technique for applications of high performance of electret motors/generators[22] and of high-density energy storage.

We cut slices of a conch shell that were less than 1 mm thick along the shell's length. The shell from which the samples were cut is shown in FIG. 1A. We used a scanning electron microscope (SEM) and a transmission electron microscope (TEM) to confirm the microarchitecture of the shell as previously reported[9] (FIG. 1B-D). The basic building blocks of the conch were found to be nano-laminas that have 50 nm by 200 nm cross-sections and are 10-20 $\mu$m in length. We conducted X-ray diffraction (XRD) experiments and found that only a few peaks appeared in the spectrum in comparison with the standard powder XRD spectrum of aragonite (FIG. 9), indicating that the nano-laminas have an orderly assembly with preferential crystalline orientations, similar to self-assembled $Fe_3O_4$ nano-particles.[23]

Figure 2:
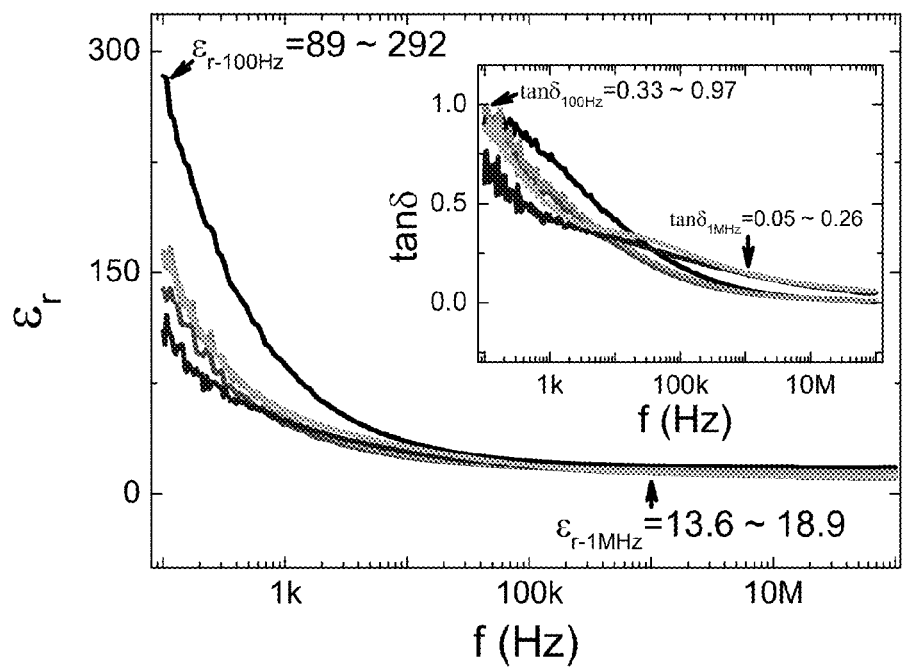
FIG. 2 is a graph illustrating the frequency dependence of dielectric constant and loss for several representative samples.

We milled the samples to a thickness of 0.50±0.01 mm for all electric measurements. The dielectric properties of the samples were then measured in the frequency range of 100 Hz to 10 MHz at room temperature. Representative curves of the frequency dependence of the dielectric properties measured on different samples is shown in FIG. 2. The relative dielectric constant fell in the range of 80-300 at the low frequency end (100 Hz) and decreased to ~13-19 at 1 MHz. The dielectric loss (tan $\delta$) decreased from 0.3-1.0 at 100 Hz to 0.05-0.3 at 1 MHz, inset to FIG. 2. These properties differ significantly from those of single crystal slices (0.5 mm thick) of $CaCO_3$ for which the dielectric constant is about 9 and independent of the frequency. In addition, the dielectric loss of a single crystal of $CaCO_3$ is very small (<0.01) across the entire frequency range. The unusually large dielectric constant of the shell indicates that the electrical properties of the bio-assembled nano-composite differ from those of single crystals of $CaCO_3$. The large dielectric loss of the conch is indicative of significant electrical leakage.

Figure 3A:
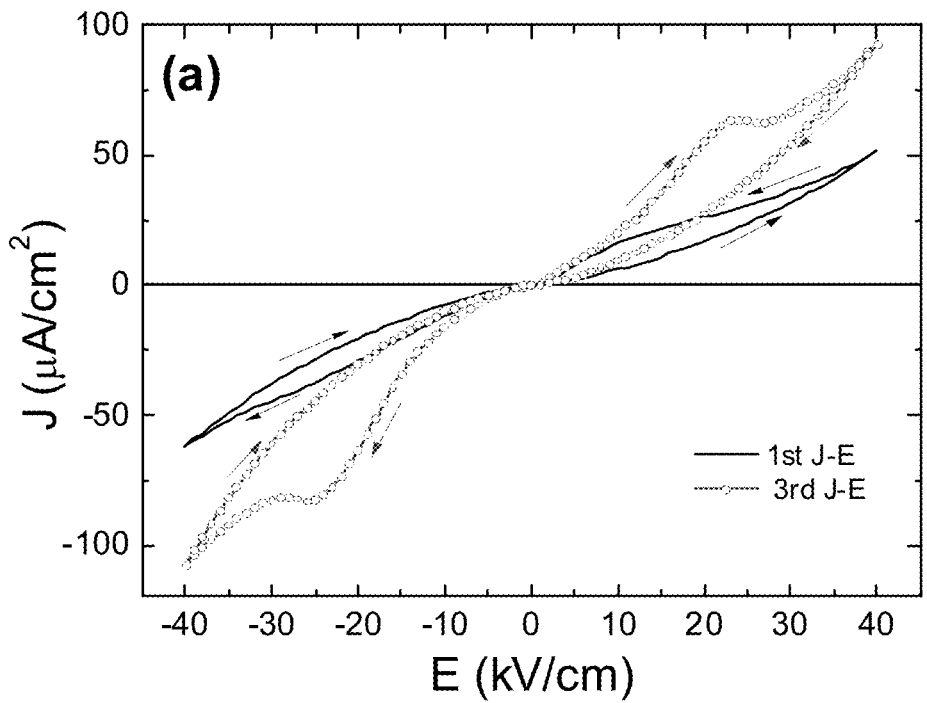
FIGS. 3A to 3F illustrate J-E loop and P-E loops measured at room temperature between −40 and 40 kV/cm.
Figure 3B:
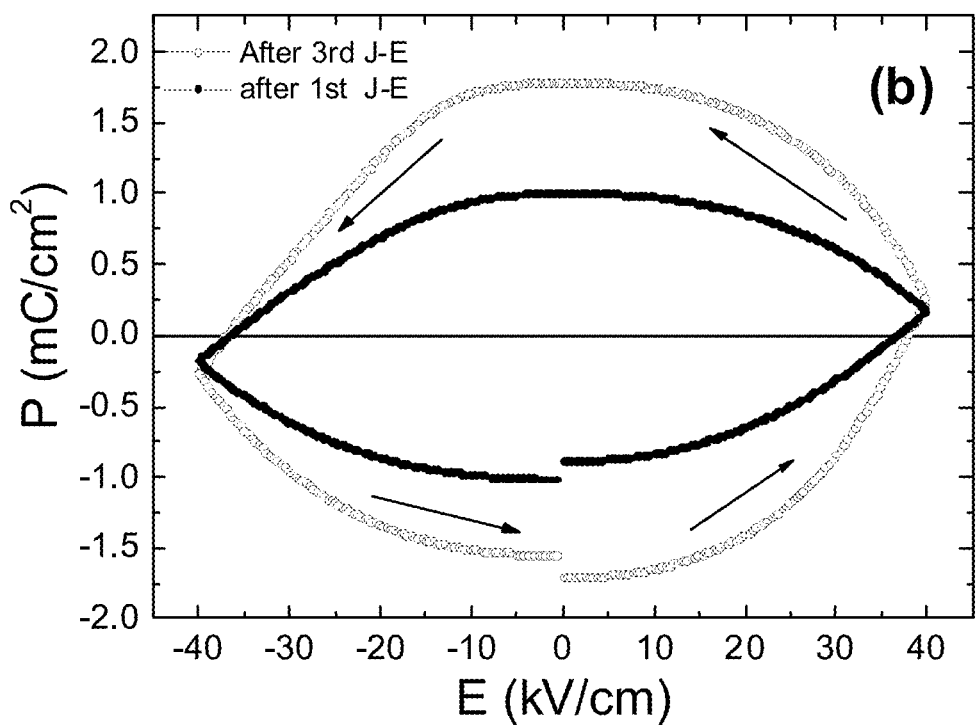
Figure 3C:
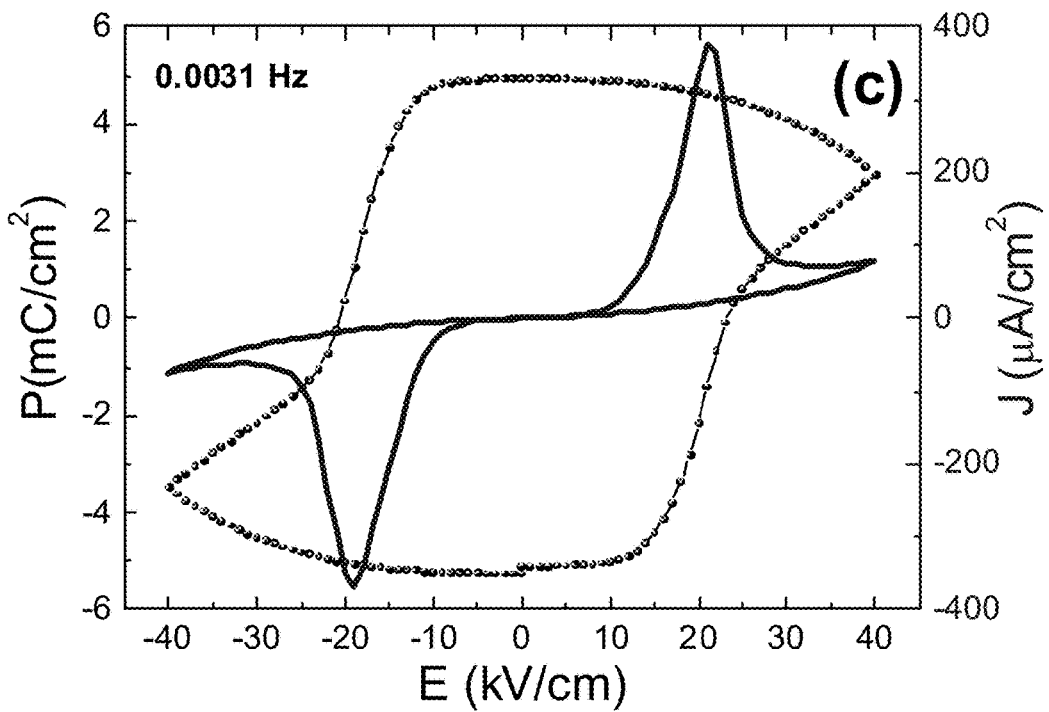

To understand this electrical leakage in the shell materials, we performed standard current-electric field measurements by sweeping the electric field in the range of ±40 kVcm$^{-1}$ with a ramping rate of 500 Vcm$^{-1}$ per second, corresponding to a field frequency of 3.1 mHz. The first and third current density (J)-electric field (E) loops are shown in FIG. 3A. The first J-E loop showed weak hysteresis. With field circling, peaks developed gradually in both directions. After a number of circles, the J-E behavior became nearly saturated and reproducible, and the peaks in the J-E loop grew higher and sharper. An example of a nearly saturated J-E loop (eighth) in FIG. 3C, which is very similar to the behavior of J-E loops of conventional ferroelectric materials, such as lead zirconate titanate (PZT) [FIG. 10]. After each J-E loop, a polarization (P)-electric field loop was measured by sweeping field from zero without pre-poling, as shown in FIG. 3B. In these P-E measurements, the field frequency is 0.01 Hz, the lowest frequency of the instrument for the P-E loop measurements. Actually, the measured P-E hysteresis is the integration of current density on the time using the data of the J-E loop following the following equation, $$P(t)=\int_0^t J(t)dt \quad (1)$$

where J(t) is the measured total current density, including induced current by dipole reversal, leakage and capacitive charging contributions. The P-E loop shown in FIG. 3C is the integration of the 8th J-E loop. For an ideal ferroelectric material, i.e. a perfect insulator, both the leakage and capacitive charging current are negligible in comparison with the current induced by dipole reversal, i.e. the peak in the field-increase process in the J-E loop [FIG. 10]. Since the leakage is much larger than the capacitive charging contribution in our samples, the current density value of the field-decrease curves in the J-E loops ($J_d$) can be taken as the leakage safely. The leakage corrected hysteresis loop can then be easily calculated as $$P(t)=\int_0^t [J(t)-J_d(t)]dt \quad (2)$$

Figure 3D:
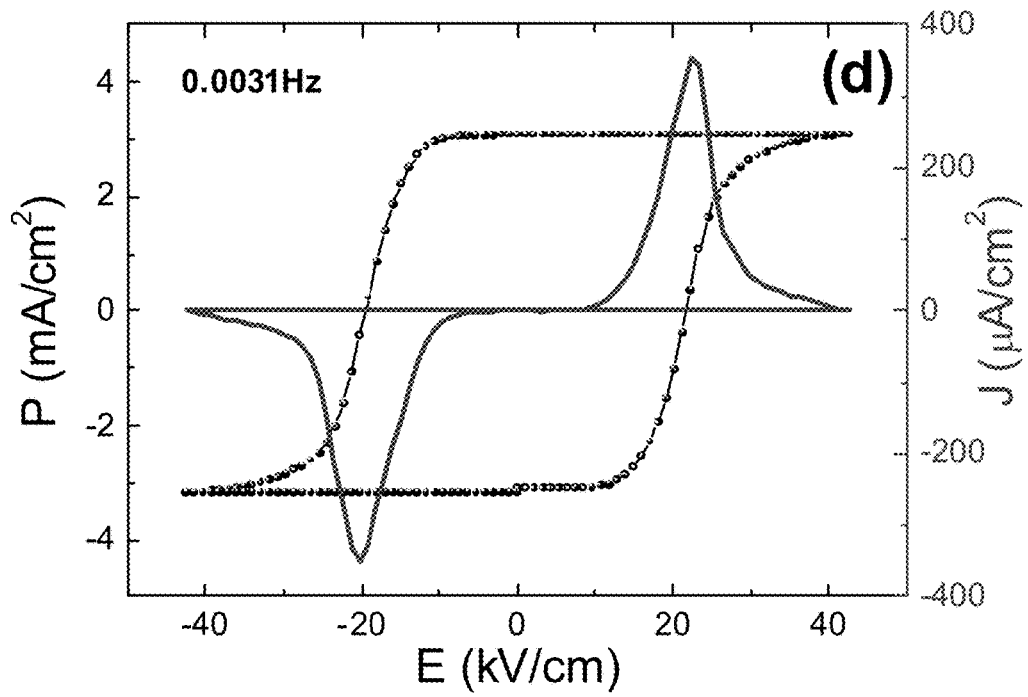

Shown in FIG. 3D are the leakage-corrected hysteresis loop and leakage-corrected current density that was used to generate the hysteresis loop.

Figure 3E:
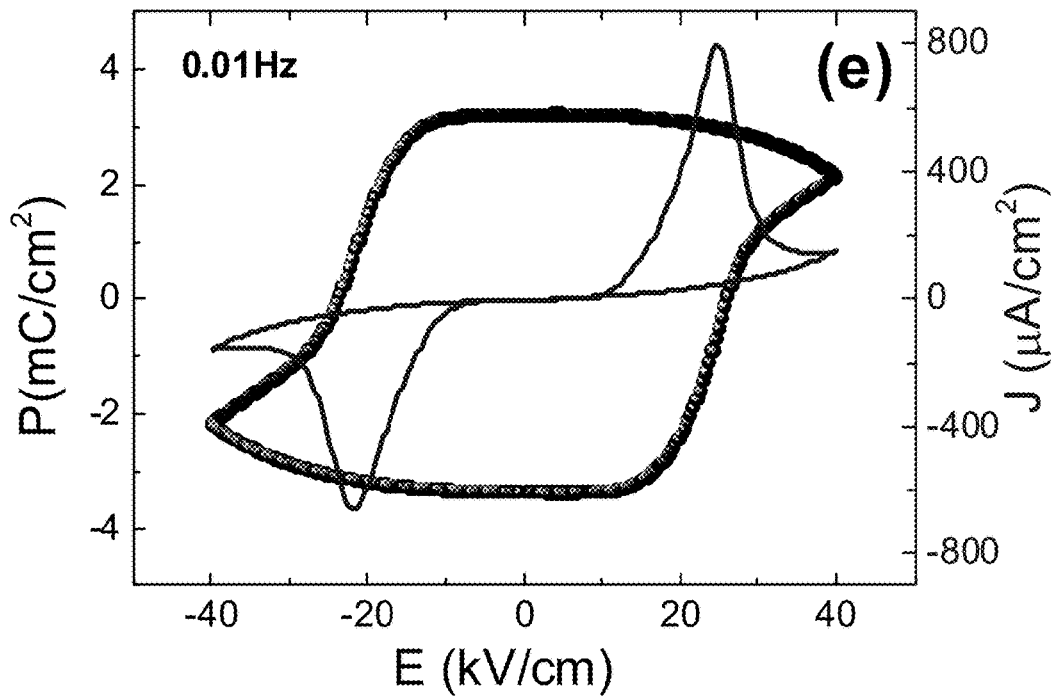
Figure 3F:
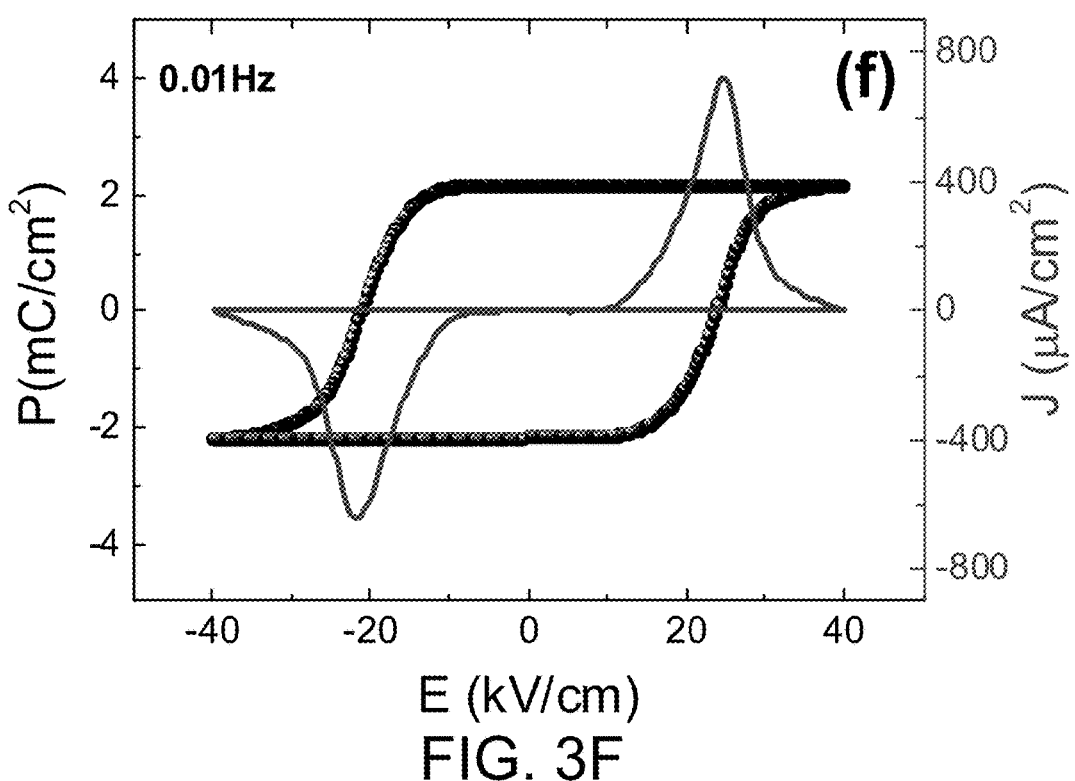

We also measured P-E loop using the standard protocol (by averaging two P-E loops with negative and positive pre-poling respectively) after the 8th J-E loop with a field-frequency of 0.01 Hz (FIG. 3E). Similarly, we use Eq. 2 calculated the leakage corrected hysteresis loop, as shown in FIG. 3F. It is clear that the leakage-corrected P-E loops are saturated, square hysteresis loop with all the features of the P-E loops of typical ferroelectret polymers[17-20] or ferroelectric materials,[24] including non-zero remanent polarization, saturation of polarization and a coercive field. It is clear that as the field was circled, the P-E loops also evolved from a olive-shaped P-E loop (a typical one due to leakage) to a square P-E loop, typical for ferroelectric/ferroelectret.

The most striking difference between the shell and standard ferroelectret and ferroelectric materials is the huge remanent polarization, ~3100 μCcm$^{-2}$ at 3.1 mHz (~2150 μCcm$^{-2}$ at 0.01 Hz), which is more than 20 times larger than the largest remanent polarization in PZT thin films (146 μCcm$^{-2}$)[21] and 2-4 orders of magnitude larger than that in the ferroelectret foams and other electrets.[17,19,20,22] We measured tens of samples and found that they all exhibited similar behaviors, but the values of the parameters, such as the remanent polarization and the coercive field, fluctuated, likely due to the non-uniformity/non-homogeneity of all bio-materials. The shape of the hysteresis loops shown in FIGS. 3D and 3F are very similar to those observed in ferroelectric polymers in which the remanent polarization and reproducible hysteresis loops were induced by field cycling.[25] We refer to the samples with sharp/reproducible peaks as poled samples.

Figure 4:
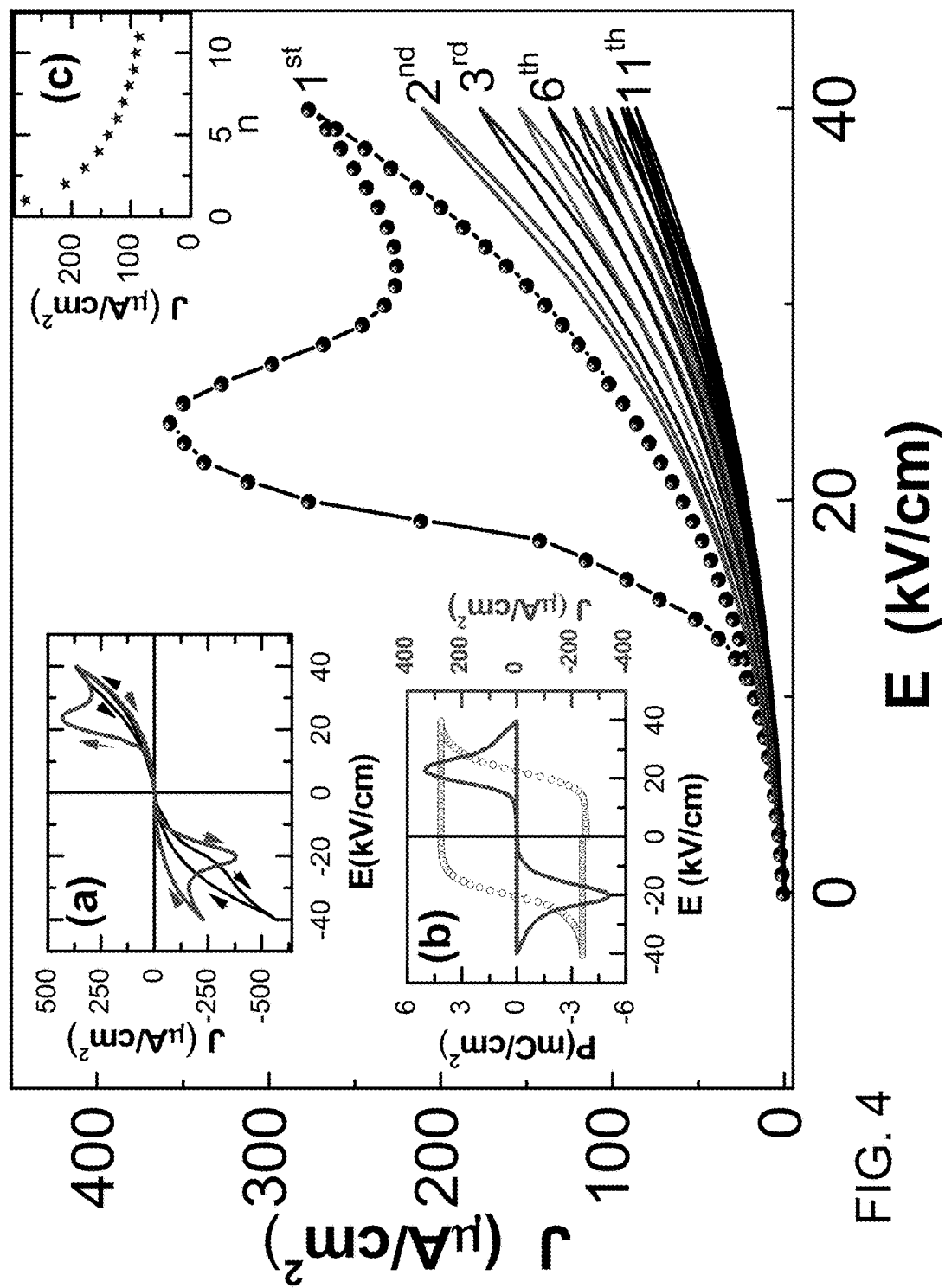
FIG. 4 is a graph that illustrates the unipolar J-E loops measured with positive field on a poled, 0.5 mm thick sample with a field ramping rate of 500 V/cm per second.

To show that these peaks in I-E curves were due to induced current by the reversal of polarization, we performed unipolar I-E loop measurements,[25] i.e., the loops were in the first or third quadrant only, although the origin of the polarization/or dipoles is not clear at this stage. Insets (a) and (b) of FIG. 4 respectively show the (first and third) I-E loops and the leakage corrected P-E loop using the third J-E loop. Before the unipolar loop measurement, the sample was poled negatively. The first unipolar I-E curve (0→40 kVcm$^{-1}$) in FIG. 4 exhibits a sharp peak at about 24 kVcm$^{-1}$. In the following I-E loops (second to eleventh), no peak was observed in either the field-increase or in field-decrease curves, because most "dipoles" had been aligned in the positive direction during the first field-increase process. The peak in the first field-increase curve must therefore be due to the induced current by the reversed polarization from negative to positive.[25]

It is worth noting that with circling the field, the current decreased and gradually approached a constant. We plotted the current density at 40 kVcm$^{-2}$ as a function of the number of loops in the inset (c) (FIG. 4) to show the trend. This observation can be interpreted as the following. During the unipolar J-E loops, the applied electric field was always positive, which always forced the "dipoles" to align up with its direction. Consequently, the alignment/reversal of the dipoles always induced a current in the same direction in both field-increase and field-decrease processes. With more and more "dipoles" were aligned up with the field direction, less and less "dipoles" left for next loop. Consequently, the current density caused by the "dipole" alignment/reversal decreased with field circling and gradually vanished. The saturated current density will finally reflect the real leakage of the sample. This again supports our conclusion that the peaks in the J-E curves are due to the current induced by the "dipole" reversal. Consequently the leakage-corrected hysteresis loops are purely originated from the reversal of electric "dipoles". It is also clear from the data in inset (c) (FIG. 4) that we have over-corrected the data and that the alignment of the "dipoles" in the shell is a very slow process.

Figure 5:
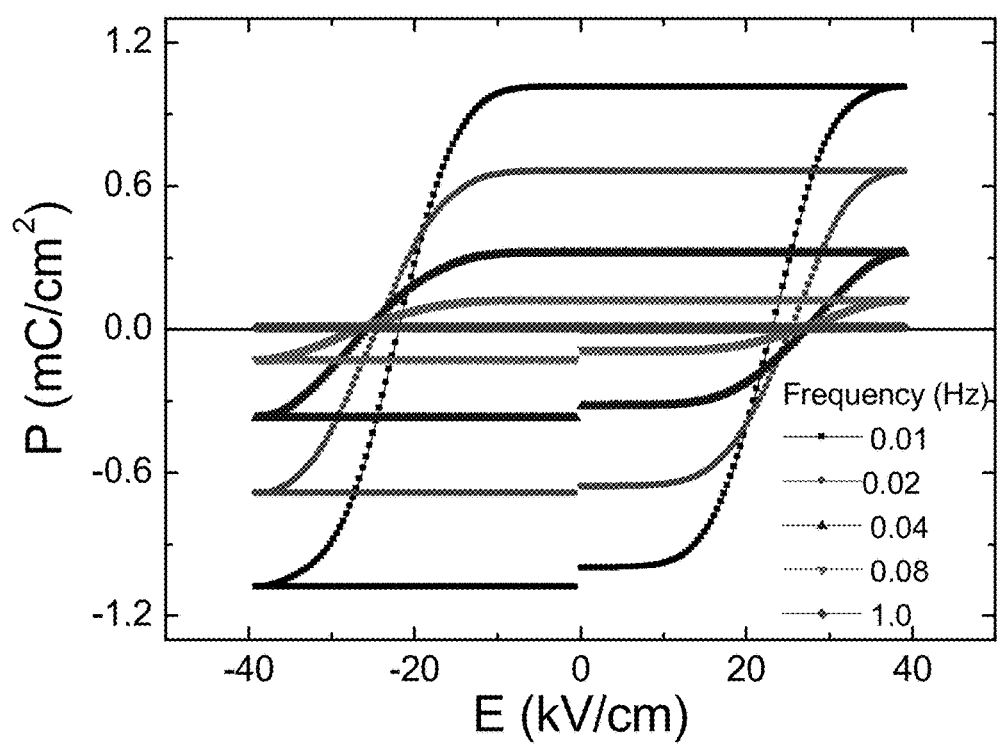
FIG. 5 is a graph that illustrates the leakage corrected P-E loops measured with a pre-poling protocol at different frequencies on a poled 0.5 mm thick sample.

To understand the characteristics of the polarization reversal, P-E loops were measured using the standard protocol at different frequencies (0.01 to 200 Hz) on a poled sample, as shown in FIG. 5. To better present the data, all the loops were leakage-corrected. It is evident that the f=0.01 Hz loop has all the features of a standard ferroelectret/ferroelectric-like P-E loop with a remanent polarization of $P_r$~1013 μCcm$^{-2}$ and a coercive field of about $E_c$=23 kVcm$^{-1}$. When the frequency increased from 0.01 Hz to 0.02, 0.04, 0.08 and 1 Hz, $P_r$ decreased from 1013 to 0.007 μCcm$^{-2}$. We also found that when f>0.2 Hz, the shape of the uncorrected P-E loop changed to one in which the leakage current is dominant. Another important feature in these P-E loops is that the coercive field increased with frequency. The frequency dependence of the remanent polarization and the coercive field is similar to characteristics of ferroelectric materials and suggests that the reversed polarization is strongly associated with the activation process[26,27] [FIG. 11]. However, the reversal of the polarization in the conch shell is extremely slow in comparison with that in conventional ferroelectrics and ferroelectret polymers.[17-20,24-29]

Figure 6A:
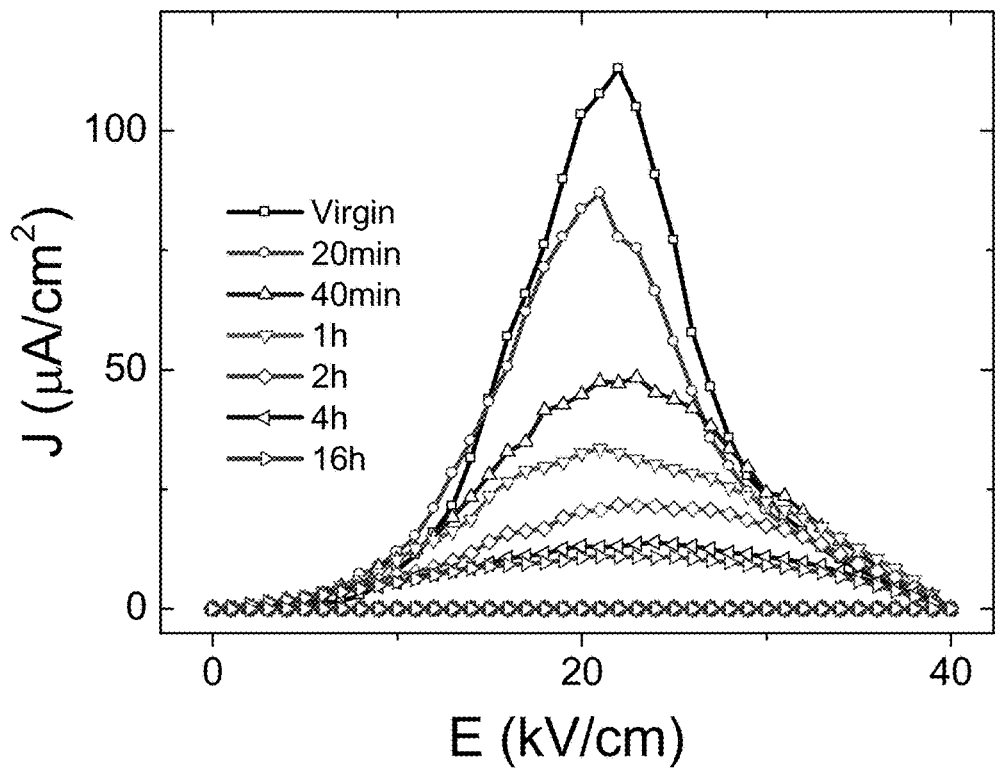
FIG. 6A illustrates the leakage corrected J-E loops measured at the different times after the sample well-poled negatively with a field ramping rate of 500 V/cm per second.
Figure 6B:
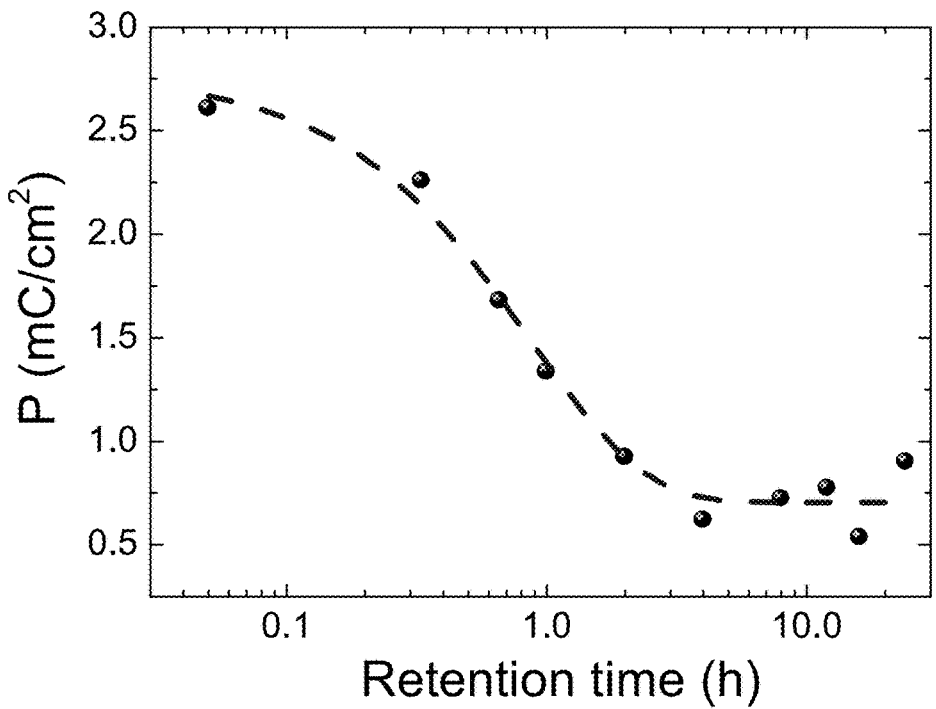
FIG. 6B is a graph that illustrates the reversed polarization calculated using the J-E curves in FIG. 6A. The polarization values in FIG. 6B are proportional to the remanent polarization.

To explore the stability of the remanent polarization of the samples, we performed the retention experiment at the room temperature on a well-poled sample with the following procedure. a) Just after the sample was well-poled negatively, the positive unipolar J-E loop was measured immediately, the first unipolar loop was denoted as the virgin state; b) To guarantee the sample to reach the same saturated state before the next unipolar loop, the sample was well-poled negatively again. Waiting for a time (t), the second unipolar loop was measured; c) Repeat step b), but with different waiting times. The reversed polarization during the field increase process can then be calculated using the data of the unipolar J-E loop. During a waiting time t, the negatively aligned dipoles try to randomize to reduce the electrostatic energy, which leads to a decrease of the remanent polarization. Consequently, the induced current by the reversal of the remanent polarization reduced with time t. Unipolar curves at different waiting times are shown in FIG. 6A. Here, we have corrected the unipolar loop by subtract the field-decrease curve. The relaxation of the polarization with time was shown in FIG. 6B. As we discussed about the unipolar loops in FIG. 4, only part of the remanent polarization was reversed. However, the reversed polarization should be proportional to the remanent polarization before switching the field. It is clear that the remnant polarization decreased from 2.6 mC/cm$^{-2}$ to a 0.7 mC/cm$^{-2}$ within 2 hours then kept nearly constant in the following 14 hours.

Figure 12:
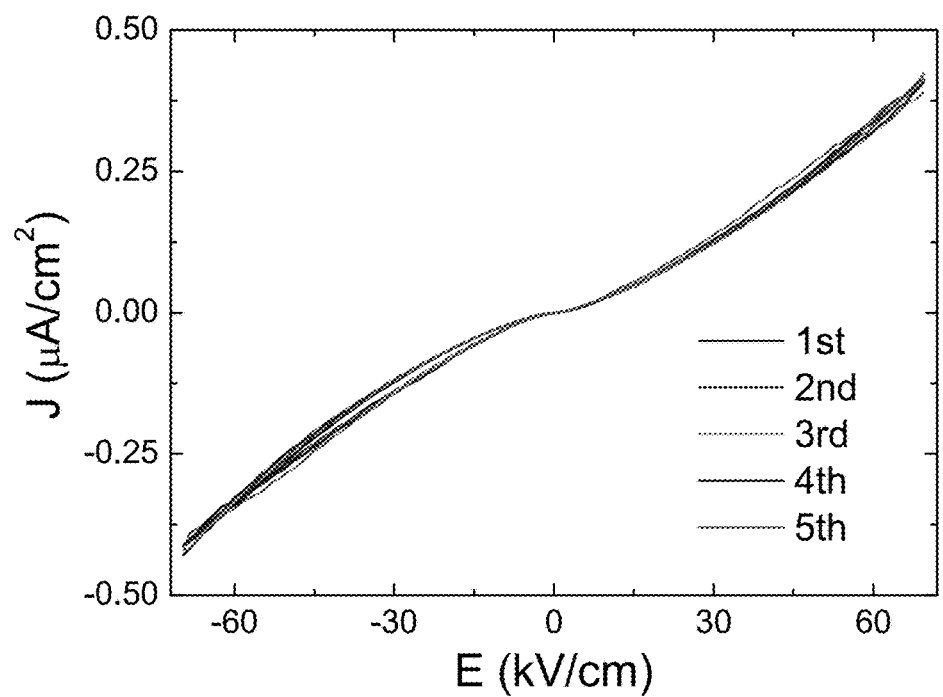
FIG. 12 is a graph that illustrates J-E curves obtained for the 0.5 mm thick, single crystal of calcite ($CaCO_3$).
Figure 13:
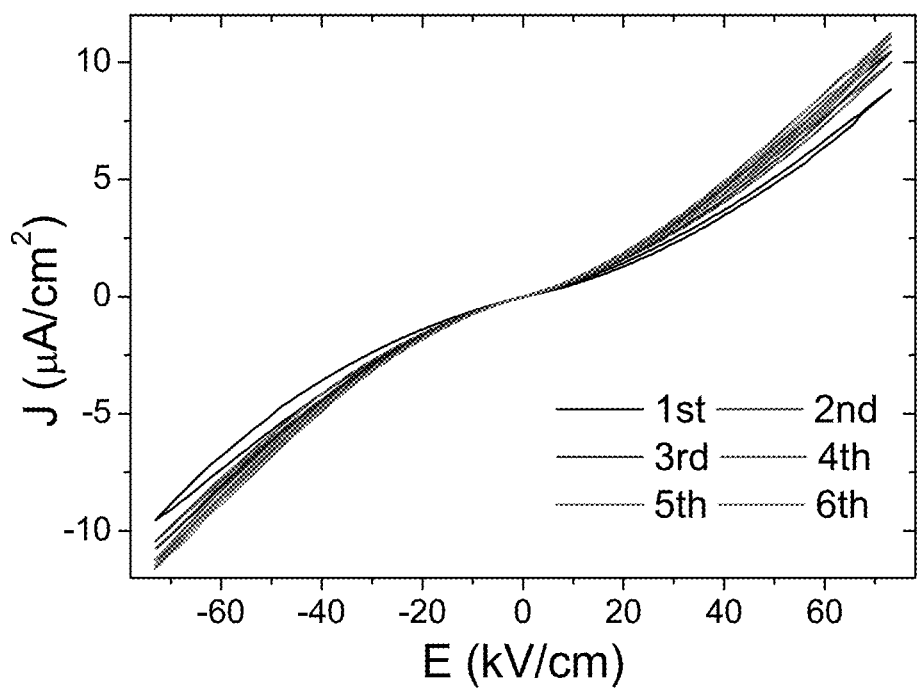
FIG. 13 is a graph that illustrates that the J-E loops were repeated six times on a 0.41 mm thick pearl oyster shell sample.

To understand the origin of the giant polarization in bio-assembled nano-composites, we measured the same J-E and P-E loops of a single crystal slice of calcite (CaCO$_3$) that was 0.5 mm thick and of a sample taken from a pearl oyster shell, a different bio-assembled aragonite composite.[8,10-12] We did not observe peaks in the J-E loops nor did we find ferroelectric/ferroelectret-like P-E hysteresis loops in either sample [FIG. 12-14], which indicate that both calcite and aragonite CaCO$_3$ are non-polar. The varied behaviors of the conch shell and the pearl oyster shell materials must come from their different microstructures/micro-architectures.

In pearl oyster shells, aragonite platelets, their basic building blocks, stack in the same direction. These platelets are about 0.5 microns thick and several hundreds of microns in length. The thickness of the organic matrix between the platelets is a few tens of nanometers[8,10-12] [FIGS. 15 and 16]. The basic building blocks of conch shells are much (~250 times) smaller than those of pearl oyster shells. More importantly, the hierarchical architecture in conch shells is much more complex than the simple stacking in pearl oyster shells.[8-12] The biopolymer layers between the nano-laminas in the conch shells form a complex three-dimensional (3D) network, which must play an important role in the extreme polarization.

Under a strong applied electric field (up to 40 kVcm$^{-1}$), the molecules in the conch shell's biopolymer layers could be gradually ionized, allowing the electrons to hop between the molecules. In addition to the field-induced conduction, the biopolymer itself might also have had weak electrical conduction. The biopolymer layers became conducting paths with high resistivity for electrons. More importantly, these layers will also act as electrodes for the "nano-capacitors", the $CaCO_3$ lamina sandwiched by conducting biopolymer layers. The bio-assembled nano-composite is a complex 3D network of resistors and capacitors in which the resistors and capacitors should be electric-field dependent. In the poled samples, the nano-capacitors should be well charged.

These charged nano-capacitors should be analogue to the charged voids in the ferroelectret cellular polymers. When an applied electric field is large enough, it triggers the breakdown of gases or creates a micro-plasma discharge in the voids of the polymer. The positive and native charges are then separated and trapped at opposite void surfaces under the electric field.[17-20] The large amount of charges and distance between the positive and native charges in a void of typical size of $100 \times 100 \times 10$ μm$^3$ form a macroscopic dipole or giant dipole that is huge in comparison with the electrical dipoles in conventional ferroelectric materials and electrets.[20,22] The direction of these giant dipoles can be switched back and forth by cycling a electric field if the field is stronger than the breakdown field of the gases in the voids. The switching of the giant dipoles has been ascribed to the internal microplasma discharge in the voids, which is analogue to the reversal process between thermally stable polarization states in ferroelectric materials and is the origin of the displayed ferroelectric-like hysteresis loops.[18] The corresponding coercive field of the hysteresis loop in the ferroelectret polymers should be equal to the breakdown field.

Therefore, the reversal of the polarity of the charged capacitors likely came from the change in the positions of the electrons and the positive charges in the polymer layer following the application of the electric field. This process may be similar to what happens in cellular ferroelectrets.[17-20] However, the position exchange of the electrons and positively charged molecules in the biopolymer layers is very slow. This slow reversal process allows us to observe a ferroelectret-like P-E loop only with a very low field frequency (FIGS. 3 and 5). In this model, the charges are distributed into millions of nano-capacitors in the body of the sample and each nano-capacitor behaves like a "giant dipole" similar to the microscopic dipoles in a conventional ferroelectret foams.

This process can be correlated to the equivalent-circuit models developed for understanding the switching kinetics and hysteresis loops of ferroelectric materials.[30,31] In these models, a unit cell of a ferroelectric material can be described as a field-dependent capacitor and a field-dependent resistor in series. It is therefore reasonable to expect to observe ferroelectric-like behaviors in our samples.

We assume that the reversal of a giant dipole has similar characteristics to those of a conventional ferromagnetic dipole. For example, ferromagnetic dipoles have a double well potential and two stable states, "up" and "down", and their reversal can be caused by thermal activation. The reversal rate between these two states can be then described by Arrhenius's law, $$\Gamma = \Gamma_0 e^{\frac{U(E)}{k_B T}}, \quad (3)$$

where $\Gamma_0 \sim 10^{12}$-$10^{13}$ Hz,[32,33] $k_B$ is the Boltzmann constant, T is the absolute temperature, U is the energy barrier and depends on the applied electric field, E.[32]

$$U(E) = V*(W_B - p_s E)^2 = V*W_B\left(1 - \frac{p_s E}{W_B}\right)^2 = U_0\left(1 - \frac{E}{E_0}\right)^2, \quad (4)$$

where V* is the activation volume in which the dipole is reversed coherently, $p_s$ is the polarization, $W_B$ is the energy barrier between the two states for $p_s$ at E=0, which is a material property. Therefore, $E_0 = W_B/p_s$ should be the characteristic field that removes the energy barrier completely.

Due to the inhomogeneity of the biopolymer layers, size of nano-laminas and the distance between the nano-laminas as shown in FIG. 1, there must be a activation volume distribution, f(V*). The time-dependent polarization change can be written as[33]

$$\Delta P(t) = \int_0^\infty 2 P f(P)(1-e^{\Gamma t}) dP = 2 p_s^2 \int_0^\infty V^* f(V^*)(1-e^{\Gamma t}) dV^*. \quad (5)$$

The corresponding current induced by $\Delta P(t)$ is then given by $$I(t) = \frac{d[\Delta P(t)]}{dt} = \frac{d[\Delta P(t)]}{dE} \frac{dD}{dt} = r \frac{d[\Delta P(t)]}{dE}, \quad (6)$$

where $$\frac{dE}{dt}$$

is the ramping rate of the applied electric field.

Figure 7A:
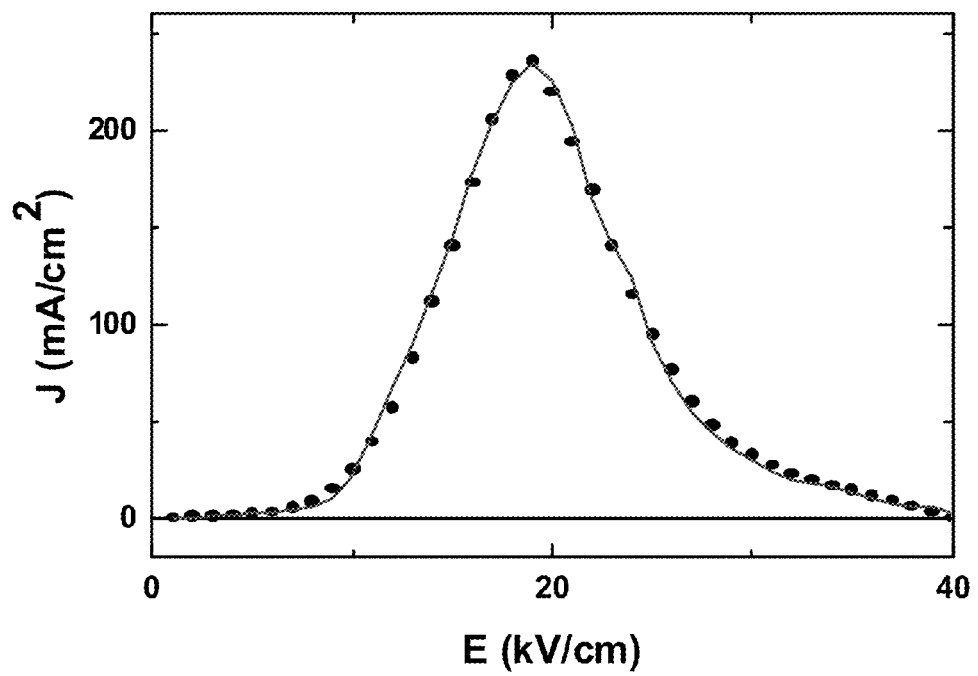
FIG. 7A is a graph that illustrates the experimental data of the induced current by dipole reversal and the fitted data.
Figure 7B:
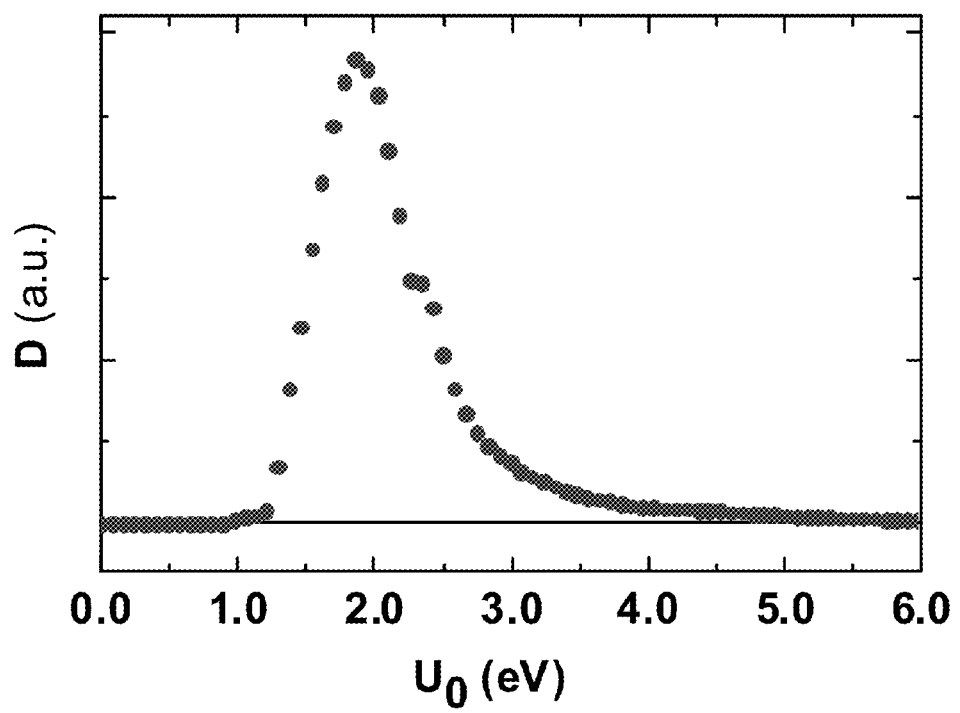
FIG. 7B is a graph that illustrates the fitted distribution (D) of U0 (or size of the dipoles).

We then fitted the leakage-corrected J-E curve in FIG. 3D using Eq. 6, because it is purely due to the reversal of the giant dipoles. To fit the J-E curve, we have to find a suitable distribution of V*. In practice, we simply need to find the distribution of $U_0(=V^*W_B)$. FIG. 7A shows the leakage-corrected J-E curve and fitting data. The fitted distribution (D) of $U_0$ is shown in FIG. 7B; it is a non-symmetric distribution with a peak value of $U_0$=1.6 eV. The other parameters are $E_0$=40 kVcm$^{-1}$ and $\Gamma_0$=1×10$^{12}$ Hz. From $U_0$=1.6 eV, the reversal frequency for the dipoles at E=0 and room temperature can be easily calculated to be about 10$^{-5}$ Hz.

Figure 8A:
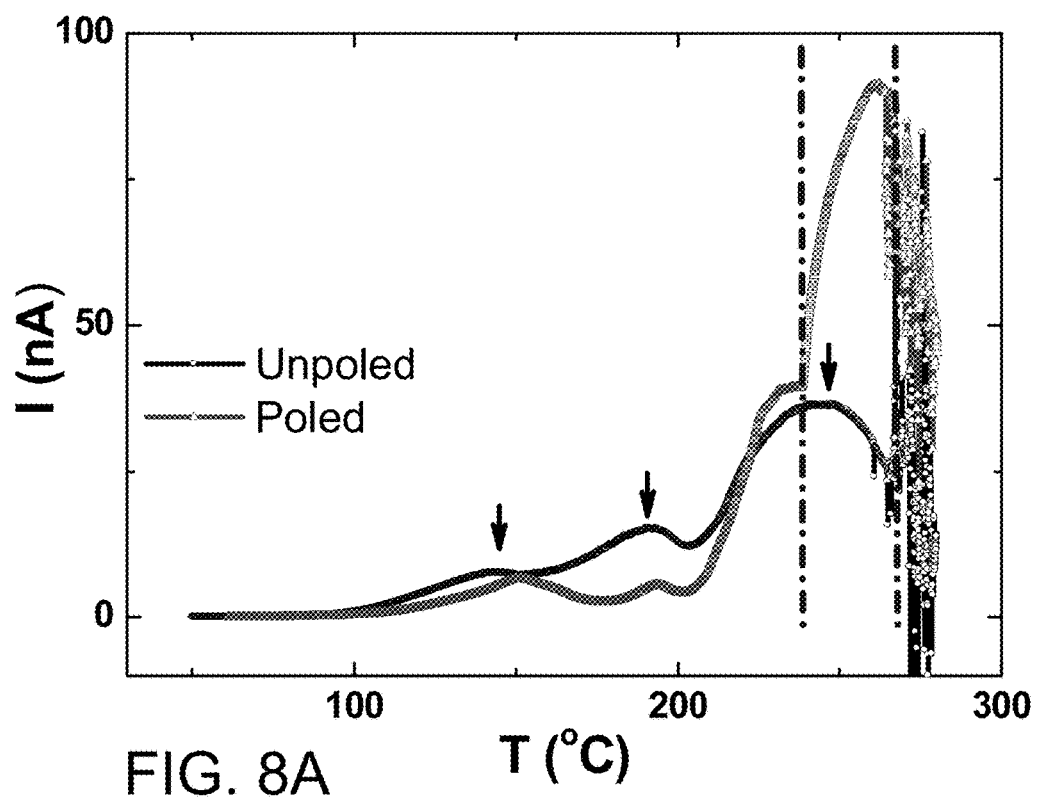
FIG. 8A is a graph that illustrates the pyroelectric currents measured on an unpoled and poled samples with the same thickness and cut from the same position on the conch shell.

To explore the potential applications of this giant polarization (or stored charges), we measured thermally stimulated currents in Conch shells. The currents obtained on the well-poled and non-poled samples in temperatures ranging from 40° C. to 300° C. are shown in FIG. 8A. In the measurements, the discharge currents were recorded as the temperature was increased linearly with time (temperature ramping technique [34-36]). Two similar samples (cut from same location and of the same thickness) were measured with one unpoled and one poled, and it is interesting to note that below 240° C., similar current profiles were observed in both samples. The sharp increase of the current at 200° C. for both samples could be caused by the decomposition and evaporation of the polymer as evidenced by the Thermo-gravimetric analysis (TGA) measurements (FIG. 17), because such evaporated polymer fragments, monomers, molecular groups etc. may carry positive or negative charges depending on their compositions [37-38]. Such a discharge current caused by the evaporating polymer fragments reached the maximum at about 240° C. and then decreased at temperatures higher than 248° C., subsequently forming a broad peak between 200° C. and 265° C. The two small peaks observed at temperatures of approximately 140° C. and 190° C. could be due to the evaporation of the polymers around the surfaces or the evaporation of polymers with different compositions. The difference in the currents at low temperatures for these two samples could be due to the inhomogeneity of the bio-materials, or the change in the state of the polymer after poling. As the temperature increased above 265° C., the measured currents began to fluctuated for both samples, which might be due to the severe decomposition of the polymer layers. The most intriguing observation is the high and narrow discharge current peak formed in the temperature range of 240 to 265° C. in the poled sample, which is found on the top of the broad peak for the unpoled sample. This huge peak must be a consequence of the softening and decomposition of the polymer leading to the collapse of the nanocapacitors, i.e. the vanishing giant dipoles. By subtracting the currents from the unpoled sample from the currents of the poled samples, we suggest that pyroelectricity is observable in conch shells. We then calculated the pyroelectric coefficients using Eq. (7) & (8)

$$I_{poled-unpoled} = A \cdot \frac{dP}{dt} = A \cdot \frac{dP}{dT}\frac{dT}{dt} = A \cdot p\frac{dT}{dt} \quad (7)$$

$$p = I_{poled-unpoled} / \left(A \cdot \frac{dT}{dt}\right) \quad (8)$$

where A is the area of electrodes, P is the polarization, p is the pyroelectric coefficient, T is the temperature, and t is the time.

Figure 8B:
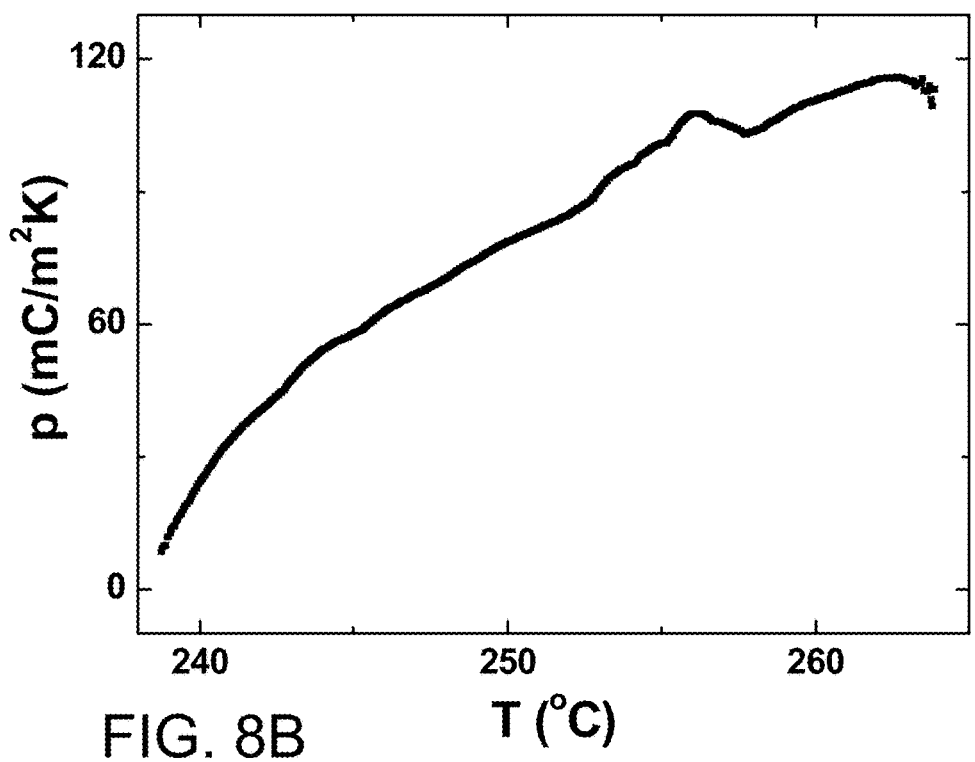
FIG. 8B is a graph of the calculated pyroelectric coefficients from the measured pyroelectric currents in the temperature range from 238° C. to 264° C.

FIG. 8B shows the temperature-dependent "pyroelectric" coefficients at 8~115 mC/m$^2$K. Without having corrected the currents from irreversible contributions, we note a 2-3 orders in magnitude larger coefficient than those of conventional ferroelectric materials (100~1000 μC/m$^2$K) [34-36, 39]. This fell within our expectations considering their giant polarization, and pyroelectric coefficients of such great magnitudes in a specific temperature range may find applications in thermal sensors/detectors.

In summary, the nano-laminas and the biopolymer layers of conch shells exhibit ferroelectret behaviors, including square P-E hysteresis loops with giant "polarization" and indications of pyroelectricity. These behaviors originate from the charged nano-capacitors that are created by the hierarchical micro-architecture of the CaCO$_3$ nano-composite in which biopolymer layers form a complex three-dimensional network. The results strongly suggest that by varying the properties of the polymers and the sizes of the nano-laminas, the polarization, coercive field and reversal frequency of the giant dipoles can be tailored for varied applications utilizing ferroelectret materials, including electret motors/generators[22] and of high-density energy storage. Interestingly, the fabrication of such composites has already seen great progress.[10,11]

Experimental Section

Sample Preparation:
For the dielectric ferroelectric measurements, circular, 200 nm thick electrodes of Pt or Au were deposited through a mask onto both sides of 0.5 mm slices of the conch shell using pulsed laser deposition.

Materials Characterization:
XRD patterns were collected on a Bruker D8 Advanced X-Ray Diffractometer. FESEM images were obtained on a FEI Quanta 600 microscope. TEM images were taken on FEI Titan ST microscopes.

Electrical Measurements:
The dielectric properties were measured first for all the samples in a frequency range of 100 Hz to 10 MHz at room temperature using an Agilent 4294A impedance analyzer. All the I-E loops and the polarization-electric field loops were measured using an aixACCT ferroelectric tester (TFA 2000) with the electric field varying linearly as 0→40 kVcm$^{-1}$→−40 kVcm$^{-1}$→0. To reduce arcing, the measurements were performed with the sample immersed in silicon oil. For the measurements of pyroelectric currents, a linearly ramping temperature was applied to the sample and meanwhile the currents were recorded. Details of the system were described in Ref. [36].

References, each of which was incorporated herein by reference:
[1] V. P. Colvin, M. C. Schlamp, A. P. Alivisatos, *Nature* 1994, 370, 354.
[2] Y. D. Yin, A. P. Alivisatos, *Nature* 2005, 437, 664.
[3] J. A. Fan, C. Wu, K. Bao, J. Bao, R. Bardhan, N. J. Halas, V. N. Manoharan, P. Nordlander, G. Shvets, F. Capasso, *Science* 2010, 328, 1135.
[4] Y. Huang, X. F. Duan, Y. Cui, L. J. Lauhon, K. H. Kim, C. M. Lieber, *Science* 2001, 294, 1313.
[5] M. S. Gudiksen, L. J. Lauhon, J. F. Wang, D. C. Smith, C. M. Lieber, *Nature* 2002, 415, 617.
[6] S. H. Park, D. Qin, Y. Xia, *Adv Mater* 1998, 10, 1028.
[7] V. F. Puntes, P. Gorostiza, D. M. Aruguete, N. G. Bastus, A. P. Alivisatos, *Nat. Mater.* 2004, 3, 263.
[8] B. L. Smith, T. E. Schaffer, M. Viani, J. B. Thompson, N. A. Frederick, J. Kindt, A. Belcher, G. D. Stucky, D. E. Morese, P. K. Hansma, *Nature* 1999, 399, 761.
[9] S. Kamat, X. Su, R. Ballarini, A. H. Heuer, *Nature* 2000, 405, 1036.
[10] Z. Y. Tang, N. A. Kotov, S. Magonov, B. Ozturk, *Nat. Mater.* 2003, 2, 413.
[11] M. Rubner, *Nature* 2003, 423, 925.
[12] X. D. Li, W. C. Chang, Y. J. Chao, R. Z. Wang, M. Chang, *Nano Lett.* 2004, 4, 613.
[13] J. B. Thompson, J. H. Kindt, B. Drake, H. G. Hansam, D. E. Morse, P. K. Hansma, *Nature* 2001, 414, 773.
[14] P. Vukusic, J. R. Sambles, *Nature* 2003, 424, 852.
[15] L. Feng, S. H. Li, Y. S. Li, H. J. Li, L. J. Zhang, J. Zai, Y. L. Song, B. Q. Liu, L. Jiang, D. B. Zhu, *Adv. Mater.* 2002, 14, 1857.
[16] R. Blossey, *Nat. Mater.* 2003, 2, 302.
[17] S. Bauer, R. Gerhard-Multhaupt, G. M. Sessler, *Phys Today* 2004, 57, 37.
[18] M. Wegener, S. Bauer, *Chem Phys Chem* 2005, 6, 1014.
[19] R. Gerhard-Multhaupt, *IEEE Trans. Dielectr. Electr. Insul.* 2002, 9 850, and references therein.
[20] M. Lindner, H. Hoislbauer, R. Schwodiauer, S. Bauer-Gogonea, S. Bauer, *IEEE Trans. Dielectr. Electr. Insul.* 2004, 11, 255.
[21] K. Y. Yun, D. Ricinschi, T. Kanashima, M. Noda, M. Okuyama, *Jpn. J. Appl. Phys.* 2004, 43, L647.
[22] G. M., Sessler, ed. *Electrets,* 2nd ed. Springer-Verlag. Berlin Heidelberg, 1987, p 52, 299 and 368.
[23] R. K. Zheng, H. W. Gu, B. xu, K. K. Fung, X. X. Zhang, S. P. Ringer, *Adv. Mater.* 2006, 18, 2418.
[24] M. Dawber, K. M. Rabe, J. F. Scott, *Rev. Mod. Phys.* 2005, 77, 1083.

[25] B. Dickens, E. Balizer, A. S. DeReggi, S. C. Roth, *J. Appl. Phys.* 1992, 72, 4258.

[26] S. Horiuchi, Y. Tokunaga, G. Giovannetti, S. Picozzi, H. Itoh, R. Shimano, R. Kumai, Y. Tokura, *Nature* 2010, 463, 789.

[27] R. E. Cohen, *Nature* 1992, 358, 136.

[28] J. F. Scott, *Science* 2007, 315, 954.

[29] W. Eerenstein, N. D. Mathur, J. F. Scott, *Nature* 2006, 442, 759.

[30] S. Sivasubramanian, A. Widom, Y. Srivastava, *IEEE Trans. on Ultrasonic Ferroelectrics and Frequency Control.* 2003, 50, 950.

[31] D. B. A. Rep, M. W. J. Prins, *J. Appl. Phys.* 1999, 85, 7923.

[32] A. K. Tagantsev, I. Stolichnov, N. S. Jeffrey, S. Cross, M. Tsukada, *Phys. Rev. B* 2002, 66, 214109.

[33] M. Vopsaroiu, J. Blackburn, M. G. Cain, P. M. Weaver, *Phys. Rev. B* 2010, 82, 024109.

[34] Igor Lubomirsky and Oscar Stafsudd, *Rev. Sci. Instrum.* 2012, 83, 051101.

[35] Sidney B. Lang, and F. Steckel, *Rev. Sci. Instrum.* 1965, 36, 929.

[36] Zhengkui Xu, Jiwei Zhai, Wai-Hung Chan, and Haydn Chen, *Appl. Phys. Lett.* 2006, 88, 132908.

[37] Byung Yang Lee, Jinxing Zhang, Chris Zueger, Woo-Jae Chung, So Young Yoo, Eddie Wang, Joel Meyer, Ramamoorthy Ramesh, and Seung-Wuk Lee, *Nature Nanotechnology* 2012, 7, 351

[38] I. Gitlin, J. D. Carbeck, and G. M. Whitesides, *Angew. Chem. Int. Ed.* 2006, 45, 3022

[39] R. W. Whatmore, *Rep. Prog. Phys.* 1986, 49, 1335.

Additional Information for Example 1

Sample Preparation for Dielectric Measurements and P-E Loops

For the dielectric ferroelectric measurements, circular, 200 nm thick electrodes of Pt or Au were deposited through a mask onto both sides of 0.5 mm slices of the conch shell using pulsed laser deposition. Two diameters of the electrodes (3 mm and 6 mm) were tested. We found that the data were independent of the size of the electrodes and of the electrode material (Pt or Au). With symmetric electrodes 6 mm in diameter and with sample thickness of about 0.5 mm or less, the system can be safely considered as a parallel capacitor.

Figure 9:
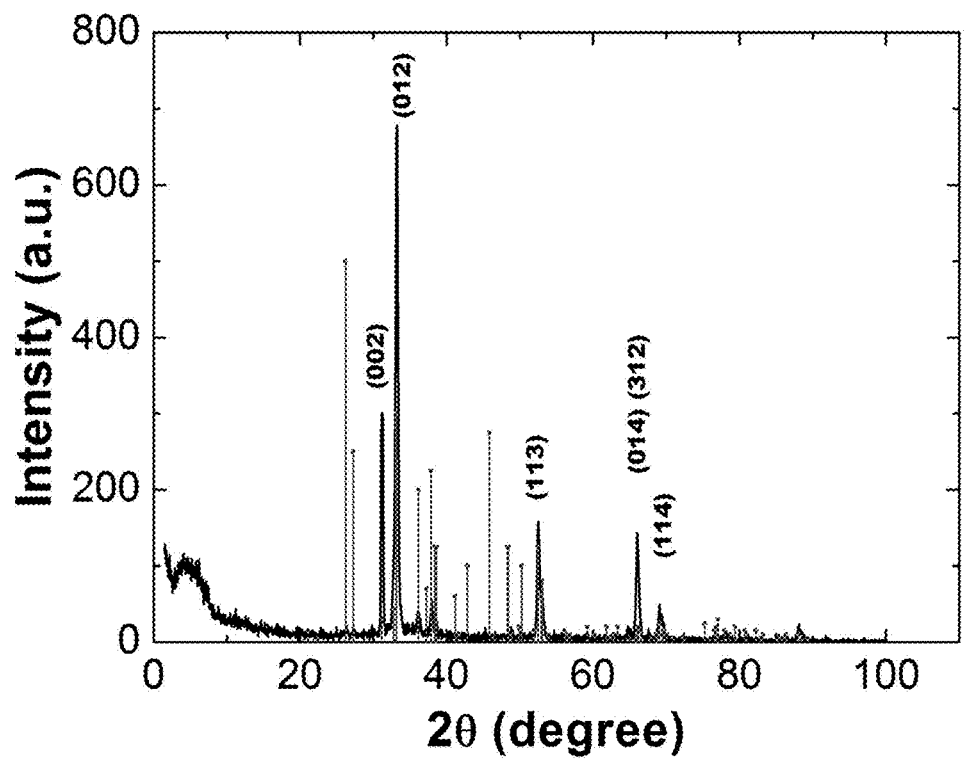
FIG. 9 is a graph that illustrates the X-ray diffraction spectrum for a sample (black line) and standard powder XRD for aragonite ((00-041-1475) (gray lines)

Measurements and Analysis:

X-ray Diffraction of the Conch Shell:

FIG. 9 shows the X-ray diffraction spectrum of a sample and a standard powder XRD spectrum for aragonite. It is evident that only a few peaks appeared, indicating that the nano-laminas are textured. FIG. 9 illustrates an X-ray diffraction spectrum for a sample (black line) and standard powder XRD for aragonite ((00-041-1475) (red lines)

Dielectric property measurements, J-E loop and P-E loop measurements:

The dielectric properties were measured first for all the samples in a frequency range of 100 Hz to 10 MHz at room temperature using an Agilent 4294A impedance analyzer.

All the J-E loops and the polarization-electric field loops were measured using an aixACCT ferroelectric tester (TFA 2000) with the electric field varying linearly as 0→40 kV/cm→−40 kV/cm→0. To reduce arcing, the measurements were performed with the sample immersed in silicon oil.

J-E and P-E Measurements on a Lead Zirconate Titanate (PZT):

We performed J-E measurements on a PZT sample that was provided by aixACCT as a standard sample for calibration.

Figure 10:
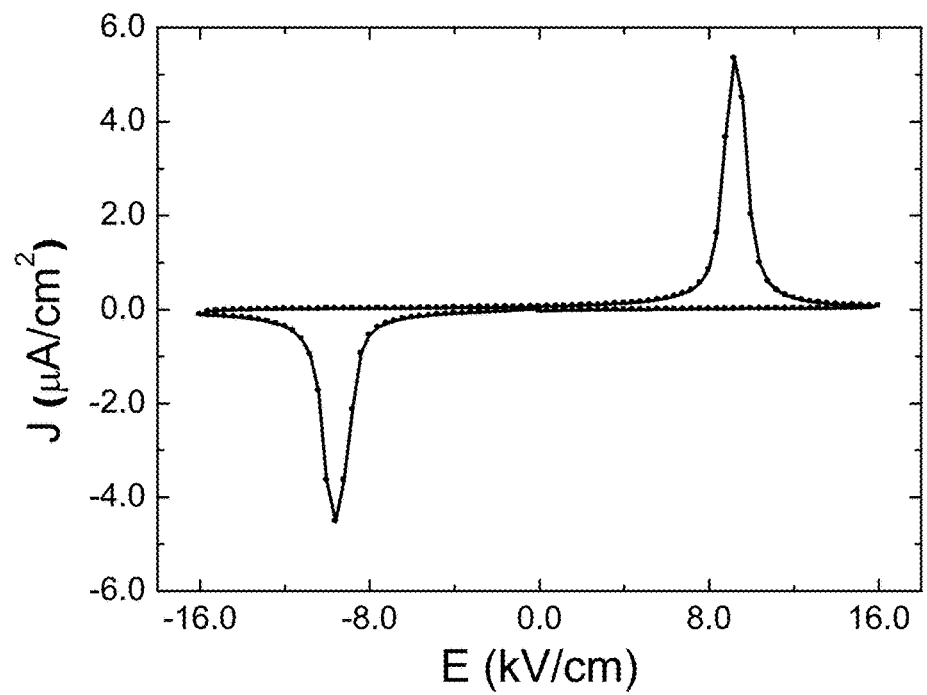
FIG. 10 is a graph that illustrates the J-E curves for PZT measured at 3.1 mHz as was done for the conch shell.
Figure 11:
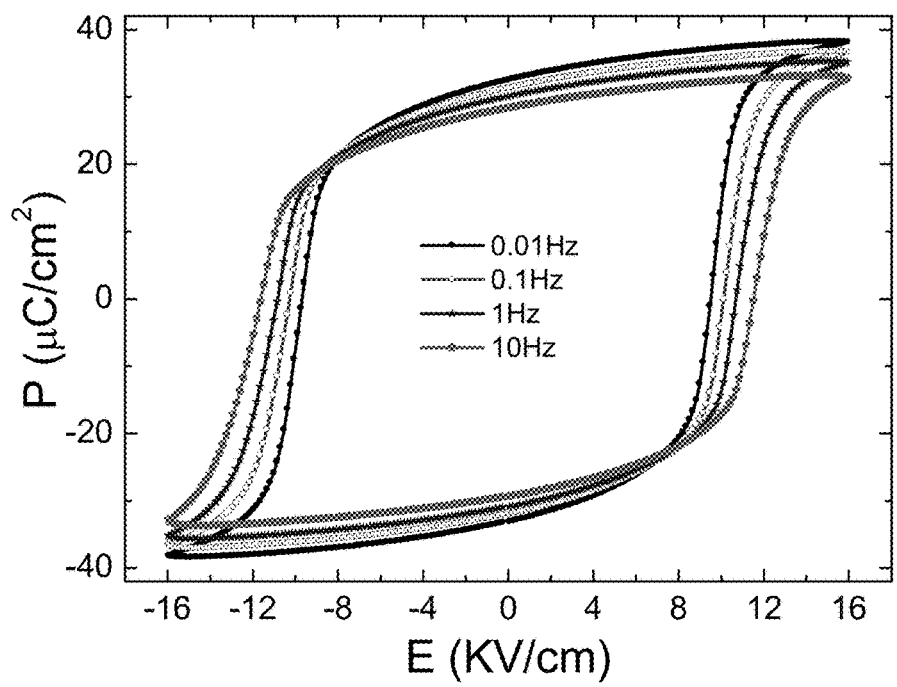
FIG. 11 is a graph that illustrates P-E curves of the PZT sample measured at different frequencies.

FIG. 10 illustrates the J-E curves for PZT measured at 3.1 mHz as was done for the conch shell, while FIG. 11 illustrates the P-E curves of the PZT sample measured at different frequencies.

J-E and P-E measurements on single crystals of calcite ($CaCO_3$) and pearl oyster shells:

The J-E measurements of a 0.5 mm thick single crystal of calcite ($CaCO_3$) and of a pearl oyster shell (0.41 mm thick) were carried out using the same protocol as used for the conch shell, e.g., the sweep rates of the E field were 500 V/cm per second and 610 V/cm per second for the single crystal of calcite and the pearl oyster shell, respectively (FIG. 12 and FIG. 13). FIG. 12 illustrates J-E curves obtained for the 0.5 mm thick, single crystal of calcite ($CaCO_3$), while FIG. 13 illustrates the J-E loops were repeated six times on a 0.41 mm thick pearl oyster shell sample.

It is evident that the behavior of the J-E curves in FIG. 12 is typical for a conventional insulator: all the curves collapsed together with no peak appearing. The resistivity can be calculated as $2.1 \times 10^{11}$ Ω·cm with an electric field of E=40 kV/cm. The overall behavior of the J-E curves of the pearl oyster shell is very similar to an insulator (FIG. 13). A close examination reveals that the J-E curves demonstrate weak hysteresis with no peaks. Another feature is that the resistivity ($1 \times 10^{10}$ Ω·cm) is about 20 times less than the single crystal of calcite. The low resistivity and the weak hysteresis should be due to the biopolymer as discussed for the conch shells. The resistivity of conch shell is about $1.5$-$3 \times 10^8$ Ω·cm at 40 kV/cm (FIGS. 2 and 3), which is much smaller than that of the pearl oyster shell.

Figure 14A:
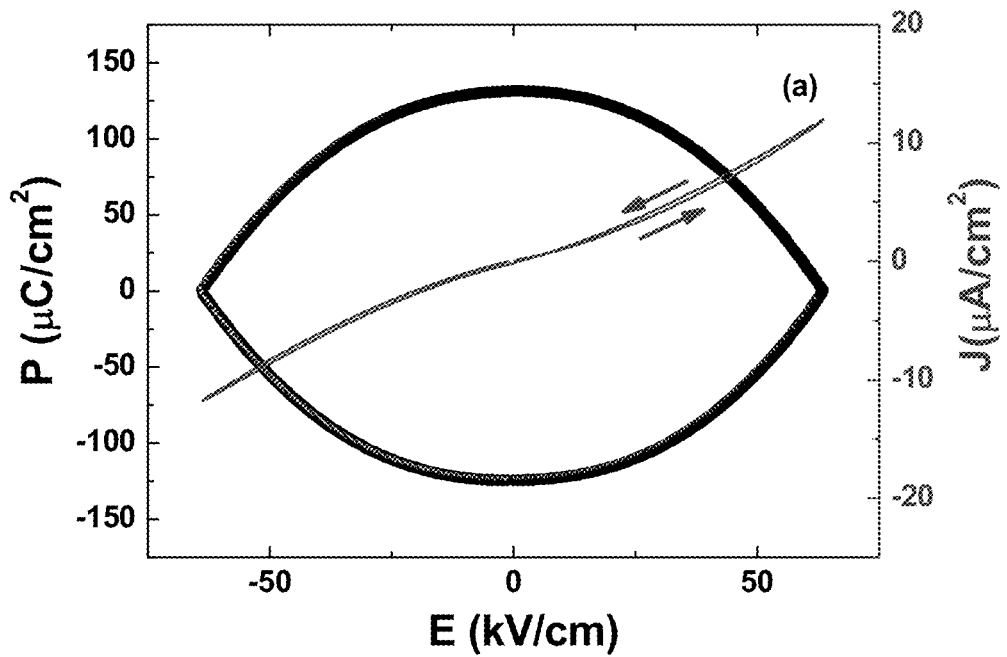
FIG. 14A is a graph that illustrates P-E loop and corresponding J-E loop of the pearl oyster shell measured at 0.01 Hz after the I-E curves shown in FIG. 13 were measured.
Figure 14B:
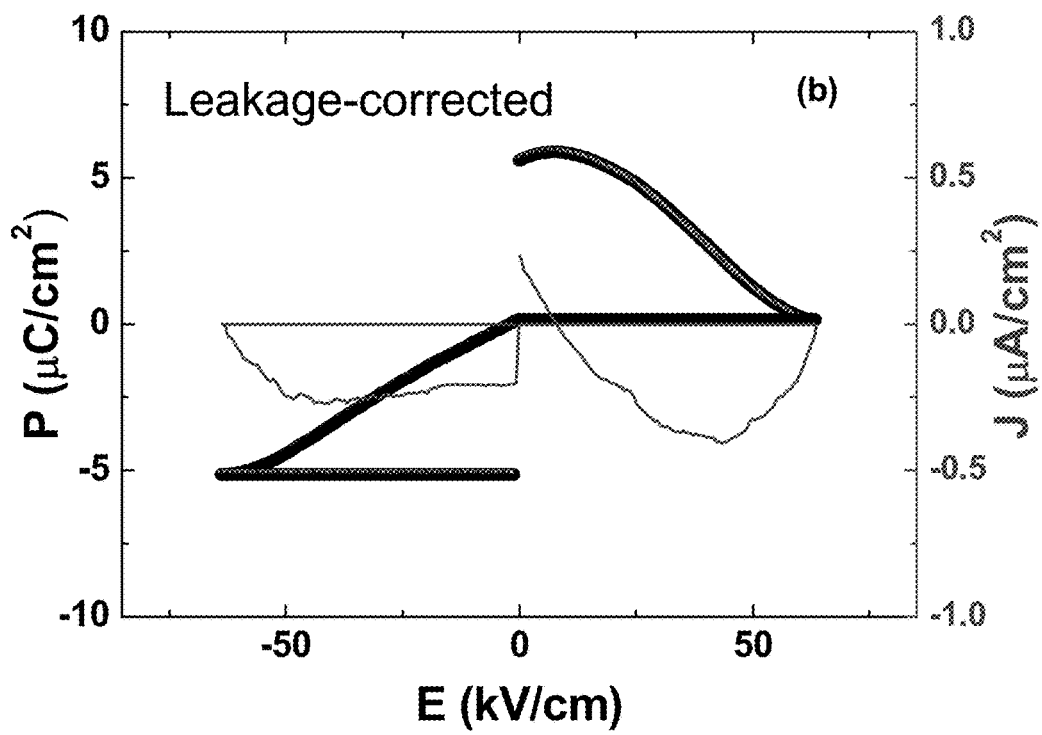
FIG. 14B is a graph that illustrates the leakage corrected P-E loop and J-E loop.

FIG. 14 shows the olive-shaped P-E loop of the pearl oyster shell measured after the J-E loops shown in FIG. 13 were measured. In particular, FIG. 14A illustrates a P-E loop and corresponding J-E loop of the pearl oyster shell measured at 0.01 Hz after the I-E curves shown in FIG. 13 were measured. FIG. 14B illustrates the leakage corrected P-E loop and J-E loop. It is clearly seen that the P-E loop is dominant by the leakage. It is clear that this loop is due to the leakage current with no polarization reversal induced current.

Figure 15:
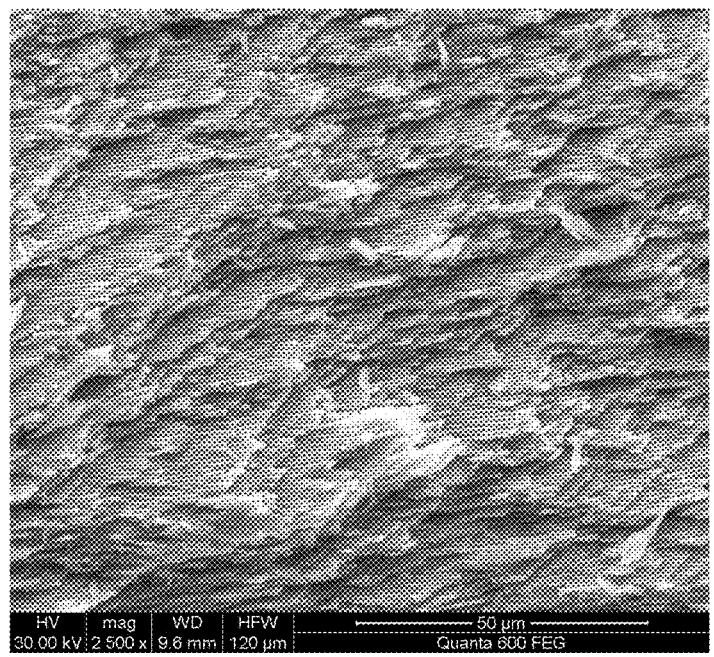
FIG. 15 is a low-magnification SEM image of a pearl oyster shell.
Figure 16:
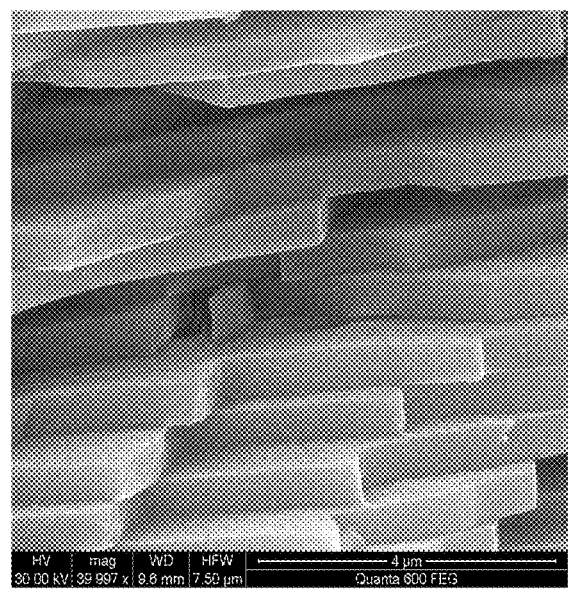
FIG. 16 is a SEM image of a pearl oyster shell.
Figure 17:
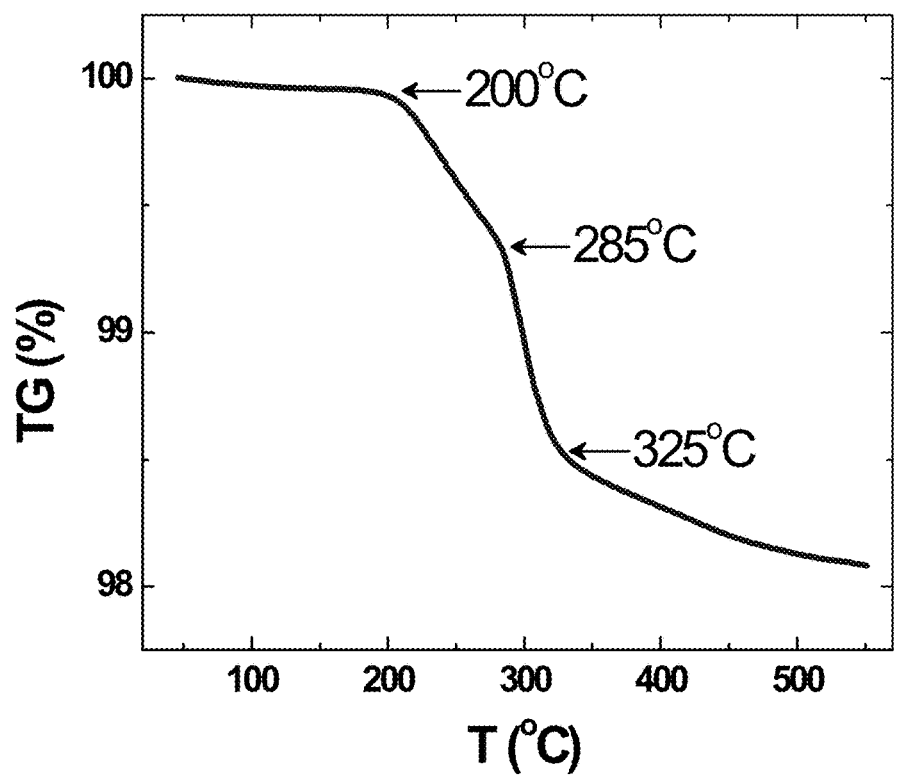
FIG. 17 is a graph that illustrates the thermal gravity (TG) analysis of a conch shell with temperature increase rate of 10° C./min.

SEM Image of Pearl Shells:

FIG. 15 illustrates a SEM image of a pearl oyster shell. The structure is the same as previously reported by different groups [1-4]. The thickness of the aragonite tiles is about 0.65 microns, which is much thicker than the 50×200 nm nano-laminas in the conch shells. FIG. 16 illustrates a SEM image of a pearl oyster shell. FIG. 17 illustrates the thermal gravity (TG) analysis of a conch shell with temperature increase rate of 10° C./min.

References, each of which is incorporated herein by reference:

1. Smith, B. L., Schaffer, T. E., Viani, M. et al. Molecular mechanistic origin of the toughness of natural adhesives, fibres and composites, *Nature* 399, 761 (1999).
2. Tang Z. Y., Kotov N. A., Magonov S. and Ozturk B. Nanostructured artificial nacre, *Nat. Mater.* 2, 413(2003).
3. Rubner, M. Synthetic sea shell. *Nature* 423, 925 (2003).
4. Li, X. D., Chang, W. C., Chao, Y. J. et al. Nanoscale structural and mechanical characterization of a natural nanocomposite material: The shell of Red Abalone. *Nano Lett* 4, 613 (2004).

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to the measuring technique and the numerical value. In addition, the phrase "about 'x' to 'y'" includes "about 'x' to about 'y'".

While only a few embodiments of the present disclosure have been shown and described herein, it will become apparent to those skilled in the art that various modifications and changes can be made in the present disclosure without departing from the spirit and scope of the present disclosure. All such modification and changes coming within the scope of the appended claims are intended to be carried out thereby.

We claim at least the following:

1. An energy storage structure, comprising: a structure selected from a nanocomposite structure including nano-$CaCO_3$ lamina dispersed in a biopolymer matrix with crystalline orientations, where the nanocomposite structure is obtained from a conch shell having predetermined dimensions and the structure has one or more characteristics selected from the following: a remanent electrical polarization of about 2 to 4 k$\mu$Ccm$^{-2}$, a relative dielectric constant of about 80 to 300 at a frequency of about 100 Hz and a relative dielectric constant of about 13 to 19 at about 1 MHz; and a remanent polarization of about 3000 to 3200 $\mu$Ccm$^{-2}$ at 3.1 mHz and a remanent polarization of about 2050 to 2250 $\mu$Ccm$^{-2}$ at 0.01 Hz.

2. The energy storage structure of claim 1, wherein the structure has a thickness of about 0.4 to 0.6 mm.

3. The energy storage structure of claim 1, wherein the biopolymer matrix is selected from: a protein, a glycoprotein, a chitin, a lustrin, and a combination thereof.

4. The energy storage structure of claim 1, further comprising one or more electrodes attached to the structure.

5. The energy storage structure of claim 4, being included in a battery or a capacitor.

* * * * *